United States Patent
Zhao et al.

(10) Patent No.: US 12,504,658 B2
(45) Date of Patent: Dec. 23, 2025

(54) LIQUID CRYSTAL HANDWRITING BOARD, HANDWRITING APPARATUS, AND HANDWRITING SYSTEM

(71) Applicants: Shandong Lanbeisite Educational Equipment Group, Shandong (CN); Beijing BOE Optoelectronics Technology Co., Ltd., Beijing (CN); BOE Technology Group Co., Ltd., Beijing (CN)

(72) Inventors: Yu Zhao, Beijing (CN); Xiaojuan Wu, Beijing (CN); Yang Ge, Beijing (CN); Jian Wang, Beijing (CN); Jiaxing Wang, Beijing (CN); Xiuliang Wang, Beijing (CN); Tianyang Han, Beijing (CN)

(73) Assignees: SHANDONG LANBEISITE EDUCATIONAL EQUIPMENT GROUP, Shandong (CN); BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 188 days.

(21) Appl. No.: 18/027,930

(22) PCT Filed: May 27, 2022

(86) PCT No.: PCT/CN2022/095762
§ 371 (c)(1),
(2) Date: Mar. 23, 2023

(87) PCT Pub. No.: WO2023/226041
PCT Pub. Date: Nov. 30, 2023

(65) Prior Publication Data
US 2024/0319530 A1   Sep. 26, 2024

(51) Int. Cl.
*G06F 3/046*  (2006.01)
*G02F 1/1333*  (2006.01)
(Continued)

(52) U.S. Cl.
CPC .... *G02F 1/13338* (2013.01); *G02F 1/134309* (2013.01); *G02F 1/1391* (2013.01); *G06F 3/0416* (2013.01); *G06F 3/046* (2013.01)

(58) Field of Classification Search
CPC .......... G02F 1/13338; G02F 1/134309; G02F 1/1391; G02F 1/1333; G02F 1/136286;
(Continued)

(56) References Cited

U.S. PATENT DOCUMENTS 8,933,897 B2   1/2015   Liu
9,612,702 B2   4/2017   Jiang et al.
(Continued)

FOREIGN PATENT DOCUMENTS

CN   102298226 A   * 12/2011   ............. G02F 1/133
CN   102681720 A   9/2012
(Continued)

OTHER PUBLICATIONS

Dictionary.com, "adjacent," in Dictionary.com Unabridged. Source location: Random House, Inc. http://dictionary.reference.com/browse/adjacent, Nov. 18, 2011, p. 1.*

*Primary Examiner* — Jeff Piziali
(74) *Attorney, Agent, or Firm* — XSENSUS LLP

(57) ABSTRACT

Provided is a liquid crystal handwriting board. The liquid crystal handwriting board includes: a first base plate and a second base plate that are oppositely disposed, and a liquid crystal layer disposed between the first base plate and the second base plate, wherein the liquid crystal layer includes bistable liquid crystal molecules; the first base plate includes: a first substrate, and an electromagnetic touch
(Continued)

layer and a pixel electrode layer that are disposed on a side of the first substrate, wherein the electromagnetic touch layer is provided with a plurality of electromagnetic signal lines, each two adjacent electromagnetic signal lines being connected in series; and the second base plate includes: a second substrate, and a common electrode layer that is disposed on a side of the second substrate.

19 Claims, 9 Drawing Sheets

(51) Int. Cl.
  *G02F 1/1343* (2006.01)
  *G02F 1/139* (2006.01)
  *G06F 3/041* (2006.01)

(58) Field of Classification Search
  CPC ........ G02F 1/139; G06F 3/0416; G06F 3/046; G06F 3/041; G06F 3/0412
  See application file for complete search history.

(56) References Cited

U.S. PATENT DOCUMENTS

| | | | |
|---|---|---|---|
| 9,753,601 B2 | 9/2017 | Jiang et al. | |
| 9,904,406 B2 | 2/2018 | Zou | |
| 10,488,974 B2* | 11/2019 | Huang | G06F 3/0446 |
| 10,514,813 B2 | 12/2019 | Xi et al. | |
| 10,747,349 B2* | 8/2020 | Peng | G06F 3/044 |
| 10,809,846 B2* | 10/2020 | Kurasawa | G06F 3/0445 |
| 11,144,169 B2 | 10/2021 | Hsu | |
| 11,175,770 B2* | 11/2021 | Chen | G06F 3/0416 |
| 11,314,368 B2* | 4/2022 | Lee | G06F 3/0446 |
| 11,385,739 B2* | 7/2022 | Kurasawa | G06F 3/04166 |
| 2008/0062140 A1* | 3/2008 | Hotelling | G02F 1/134309 345/173 |
| 2012/0154326 A1* | 6/2012 | Liu | G06F 3/0446 345/174 |
| 2012/0154327 A1* | 6/2012 | Liu | G06F 3/042 345/173 |
| 2014/0078104 A1* | 3/2014 | Lee | G06F 3/0446 345/174 |
| 2015/0277601 A1* | 10/2015 | Tahara | G06F 3/046 345/173 |
| 2015/0277633 A1* | 10/2015 | Jiang | G02F 1/133512 345/174 |
| 2015/0331504 A1* | 11/2015 | Chen | G06F 3/046 345/174 |
| 2016/0041677 A1* | 2/2016 | Tahara | G06F 3/04166 345/174 |
| 2016/0202815 A1* | 7/2016 | Zheng | H10D 86/60 345/174 |
| 2016/0357306 A1* | 12/2016 | Zou | G06F 3/0412 |
| 2017/0177122 A1 | 6/2017 | Jiang et al. | |
| 2018/0074623 A1 | 3/2018 | Xi et al. | |
| 2018/0335679 A1* | 11/2018 | Hashimoto | G02F 1/13338 |
| 2019/0339811 A1* | 11/2019 | Katsuta | G06F 3/0416 |
| 2020/0379594 A1* | 12/2020 | Chiang | G06F 3/04166 |

FOREIGN PATENT DOCUMENTS

| | | |
|---|---|---|
| CN | 103927044 A | 7/2014 |
| CN | 103927070 A | 7/2014 |
| CN | 103941951 A | 7/2014 |
| CN | 104375732 A | 2/2015 |
| CN | 102609128 B | 8/2015 |
| CN | 103941952 B | 3/2017 |
| CN | 109085949 A | 12/2018 |
| CN | 110568954 A | 12/2019 |
| CN | 107193169 B | 7/2020 |
| CN | 113485589 A | 10/2021 |
| CN | 113687742 A | 11/2021 |
| CN | 113823638 A | 12/2021 |
| JP | 2003-015821 A | 1/2003 |

* cited by examiner

LIQUID CRYSTAL HANDWRITING BOARD, HANDWRITING APPARATUS, AND HANDWRITING SYSTEM

CROSS-REFERENCE TO RELATED APPLICATIONS

This application is a U.S. national stage of international application No. PCT/CN2022/095762, filed on May 27, 2022, the disclosure of which is incorporated herein by reference in its entirety.

TECHNICAL FIELD

The present disclosure relates to the field of display technologies, and in particular, relates to a liquid crystal handwriting board, a handwriting apparatus, and a handwriting system.

BACKGROUND OF THE INVENTION

Handwriting boards are electronic devices for writing characters and drawing. Liquid crystal handwriting boards have advantages of low power consumption and clear handwriting, and thus have occupied more market share in recent years.

SUMMARY OF THE INVENTION

Embodiments of the present disclosure provide a liquid crystal handwriting board, a handwriting apparatus, and a handwriting system.

In some embodiments of the present disclosure, a liquid crystal handwriting board is provided. The liquid crystal handwriting board includes: a first base plate and a second base plate that are oppositely disposed, and a liquid crystal layer disposed between the first base plate and the second base plate, wherein the liquid crystal layer includes bistable liquid crystal molecules; the first base plate includes: a first substrate, and an electromagnetic touch layer and a pixel electrode layer that are disposed on a side of the first substrate, wherein the electromagnetic touch layer is provided with a plurality of electromagnetic signal lines, each two adjacent electromagnetic signal lines being connected in series; and the second base plate includes: a second substrate and a common electrode layer that is disposed on a side of the second substrate.

In some embodiments, the first base plate further includes: a plurality of first connection structures and a plurality of second connection structures, wherein the plurality of first connection structures are all distributed on one side of the plurality of electromagnetic signal lines, and the plurality of second connection structures are all distributed on the other side of the plurality of electromagnetic signal lines; wherein one end of a first electromagnetic signal line is electrically connected to one end of a second electromagnetic signal line by one first connection structure, and the other end of the first electromagnetic signal line is electrically connected to one end of a third electromagnetic signal line by one second connection structure, wherein the first electromagnetic signal line is one of the plurality of electromagnetic signal lines, the second electromagnetic signal line is an electromagnetic signal line in the plurality of electromagnetic signal lines disposed on a side of the first electromagnetic signal line, and the third electromagnetic signal line is an electromagnetic signal line in the plurality of electromagnetic signal lines disposed on a side, distal from the second electromagnetic signal line, of the first electromagnetic signal line; and the plurality of first connection structures and the plurality of second connection structures are all switches.

In some embodiments, the first base plate further includes: a plurality of data lines and a plurality of gate lines, wherein the plurality of electromagnetic signal lines in the electromagnetic touch layer are at least one of the plurality of data lines and the plurality of gate lines.

In some embodiments, the switch includes a first electrode, a second electrode, and a control electrode, wherein the control electrode is configured to conduct the first electrode and the second electrode upon receiving a conduction signal, and the first electrode and the second electrode are respectively electrically connected to end parts of two of the plurality of electromagnetic signal lines;

the first base plate further includes: at least two switch control lines, wherein in the at least two switch control lines, one switch control line is electrically connected to the control electrodes of at least part of the plurality of first connection structures, and the other switch control line is electrically connected to the control electrodes of at least part of the plurality of second connection structures;

wherein in the case that both the first connection structure and the second connection structure are turned on under control of the at least two switch control lines, the electromagnetic signal lines electrically connected to the first connection structure and the second connection structure are sequentially connected in series.

In some embodiments, the at least two switch control lines include N groups of switch control lines, N being an integer greater than 1; wherein one group of switch control lines includes: one switch control line for being electrically connected to the control electrodes of at least part of the plurality of first connection structures and one switch control line for being electrically connected to the control electrodes of at least part of the plurality of second connection structures; and the control electrodes of the adjacent first connection structures are respectively electrically connected to different groups of switch control lines; and the control electrodes of the adjacent second connection structures are respectively electrically connected to different groups of switch control lines.

In some embodiments, the liquid crystal handwriting board includes: N adjacently disposed first connection structures and N adjacently disposed second connection structures;

wherein the N adjacently disposed first connection structures are respectively electrically connected to different groups of the N groups of switch control lines, and the N adjacently disposed second connection structures are respectively electrically connected to different groups of the N groups of switch control lines.

In some embodiments, in at least part of a region of the liquid crystal handwriting board, the N adjacently disposed first connection structures are equally spaced apart, and the N adjacently disposed second connection structures are equally spaced apart.

In some embodiments, the at least two switch control lines include two switch control lines disposed at the same layer;

wherein in the two switch control lines, one switch control line is electrically connected to the control electrodes of all the plurality of first connection structures, and the other switch control line is electrically connected to the control electrodes of all the plurality of second connection structures.

In some embodiments, the electromagnetic touch layer is disposed on a side of the first substrate proximal to the second base plate, the first base plate includes two electromagnetic touch layers, the electromagnetic signal lines in one electromagnetic touch layer are the data lines, and the electromagnetic signal lines in the other electromagnetic touch layer are the gate lines; the data lines extend along a first direction, the gate lines extend along a second direction, the first direction being different from the second direction;

the at least two switch control lines include: two first switch control lines and two second switch control lines, wherein an extension direction of the first switch control lines is the second direction, and an extension direction of the second switch control lines is the first direction;

the data lines in the plurality of data lines serving as the electromagnetic signal lines are multiplexed data lines; the gate lines in the plurality of gate lines serving as the electromagnetic signal lines are multiplexed gate lines;

wherein the plurality of data lines are arranged between the two first switch control lines, and the first switch control lines are electrically connected to the control electrodes of the switches for connecting two adjacent multiplexed data lines; and the plurality of gate lines are arranged between the two second switch control lines, and the second switch control lines are electrically connected to the control electrodes of the switches for connecting two adjacent multiplexed gate lines.

In some embodiments, at least one of the multiplexed data line and the multiplexed gate line is provided with a plurality of electromagnetic enhancement parts and a plurality of connection parts which are electrically connected, wherein the plurality of electromagnetic enhancement parts and the plurality of connection parts are alternately arranged one by one.

In some embodiments, in the case that the multiplexed data line is provided with the plurality of electromagnetic enhancement parts and the plurality of connection parts, an orthographic projection of a part of the gate line on the first substrate is within a region defined by an orthographic projection of the electromagnetic enhancement parts of the multiplexed data line on the first substrate; and/or
in the case that the multiplexed gate line is provided with the plurality of electromagnetic enhancement parts and the plurality of connection parts, an orthographic projection of a part of the data line on the first substrate is within a region defined by an orthographic projection of the electromagnetic enhancement parts of the multiplexed gate line on the first substrate.

In some embodiments, the electromagnetic enhancement parts are annular parts or U-shaped parts.

In some embodiments, the first base plate is provided with a plurality of sub-pixel regions arranged in an array; and
at least one of the multiplexed data line and the multiplexed gate line is provided with a plurality of first extension parts and a plurality of second extension parts that are electrically connected, wherein the first extension parts and the second extension parts are alternately arranged one by one and end to end, an extension direction of the first extension parts is intersected with an extension direction of the second extension parts;

and any two adjacent first extension parts and the second extension part between the any two adjacent first extension parts form a bending structure, wherein a region defined by the bending structure semi-surrounds at least part of one sub-pixel region.

In some embodiments, the two electromagnetic touch layers are respectively a first electromagnetic touch layer and a second electromagnetic touch layer, wherein the first electromagnetic touch layer and the second electromagnetic touch layer both are provided with two signal ports; wherein
the two signal ports in the first electromagnetic touch layer are insulated from the two signal ports in the second electromagnetic touch layer, the two signal ports in the first electromagnetic touch layer are both signal input ports, and the two signal ports in the second electromagnetic touch layer are both signal output ports; or
the two signal ports in the first electromagnetic touch layer are respectively electrically connected to the two signal ports in the second electromagnetic touch layer, and the two signal ports in the first electromagnetic touch layer and the two signal ports in the second electromagnetic touch layer are all signal output ports.

In some embodiments, in the case that the two signal ports in the first electromagnetic touch layer are respectively electrically connected to the two signal ports in the second electromagnetic touch layer, two ends of one first switch control line are respectively electrically connected to one ends of the two second switch control lines, and two ends of one second switch control line are respectively electrically connected to one ends of the two first switch control lines.

In some embodiments, the data lines in at least part of the region of the liquid crystal handwriting board all serve as the multiplexed data lines, and/or the gate lines in at least part of the region of the liquid crystal handwriting board all serve as the multiplexed gate lines.

In some embodiments, the plurality of electromagnetic signal lines are organized into two groups, wherein the two groups of electromagnetic signal lines are disposed in different layers, and two ends of one electromagnetic signal line in one group of electromagnetic signal lines are respectively electrically connected to two electromagnetic signal lines in the other group of electromagnetic signal lines;
the first base plate is provided with a plurality of sub-pixel regions arranged in an array;
the electromagnetic signal lines all include a plurality of signal line segments connected in series in sequence, a part of the plurality of signal line segments are parallel to a row arrangement of the plurality of sub-pixel regions, and the other part of the plurality of signal line segments are parallel to a column arrangement of the plurality of sub-pixel regions;
wherein in the case that one end of one electromagnetic signal line in one group of electromagnetic signal lines is electrically connected to one end of one electromagnetic signal line in the other group of electromagnetic signal lines, the two electromagnetic signal lines are capable of defining at least one sub-pixel region.

In some embodiments, one electromagnetic signal line in one group of electromagnetic signal lines semi-surrounds at least one sub-pixel region.

In some embodiments, the first base plate further includes: a plurality of data lines and a plurality of gate lines, wherein the electromagnetic signal lines are disposed in different layers from the plurality of data lines and in different layers from the plurality of gate lines;

the electromagnetic touch layer is disposed on a side of the first substrate proximal to the second substrate, an insulating layer is disposed on a side of the electromagnetic signal line facing away from the first substrate, and the pixel electrode layer is disposed on a side of the insulating layer facing away from the first substrate; or the electromagnetic touch layer is disposed on a side of the first substrate facing away from the second substrate.

In some embodiments, the first base plate further includes: a plurality of drive transistors, and the pixel electrode layer is provided with a plurality of pixel electrodes electrically connected to the plurality of drive transistors in one-to-one correspondence.

In some embodiments, the first substrate or the second substrate is a flexible substrate, wherein the flexible substrate is disposed on a writing side of the liquid crystal handwriting board.

In some embodiments of the present disclosure, a handwriting apparatus is provided and includes: any above liquid crystal handwriting board, and a control assembly electrically connected to the liquid crystal handwriting board;

wherein the control assembly is configured to: in the case that the liquid crystal handwriting board is in an erasing mode, determine position information of a to-be-erased region by the electromagnetic touch layer, and apply a pixel voltage to pixel electrodes in the to-be-erased region, such that a voltage difference is formed between the pixel electrodes in the to-be-erased region and the common electrode layer.

In some embodiments, the control assembly is configured to: in the case that the liquid crystal handwriting board is in the erasing mode, acquire a first induction signal output by the electromagnetic touch layer, and determine the position information of the to-be-erased region based on the first induction signal and a corresponding relationship between a touch position recorded by the control assembly and the induction signal.

In some embodiments, the control assembly is configured to: in the case that the liquid crystal handwriting board is in a writing mode, determine position information of handwriting by the electromagnetic touch layer, and generate image information corresponding to the handwriting; and the control assembly is further configured to: in the case that the liquid crystal handwriting board is in the writing mode, acquire a second induction signal output by the electromagnetic touch layer, and determine the position information of the handwriting based on the second induction signal and the corresponding relationship.

In some embodiments, the handwriting apparatus further includes: a changeover switch electrically connected to the control assembly, and configured to control the liquid crystal handwriting board to be switched between the erasing mode and the writing mode.

In some embodiments of the present disclosure, a handwriting system is provided and includes an erasing tool and any above handwriting apparatus, wherein the erasing tool has a first coil structure.

In some embodiments, the handwriting system further includes: a handwriting tool having a second coil structure.

BRIEF DESCRIPTION OF DRAWINGS

For clearer description of the technical solutions in the embodiments of the present disclosure, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION OF THE INVENTION

For clearer descriptions of the objectives, technical solutions, and advantages of the present disclosure, the embodiments of the present disclosure are described in detail hereinafter with reference to the accompanying drawings.

Figure 1:
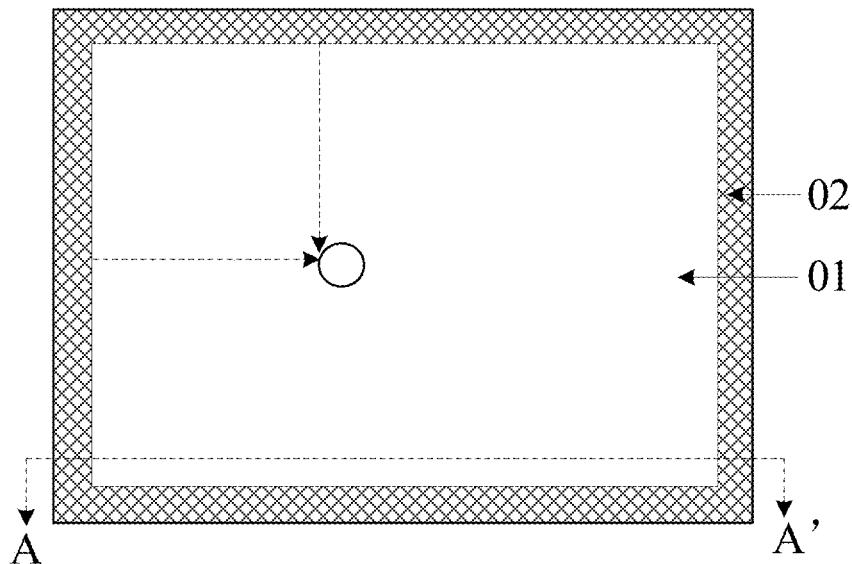
FIG. 1 is a top view of a liquid crystal handwriting board in some practices.
Figure 2:
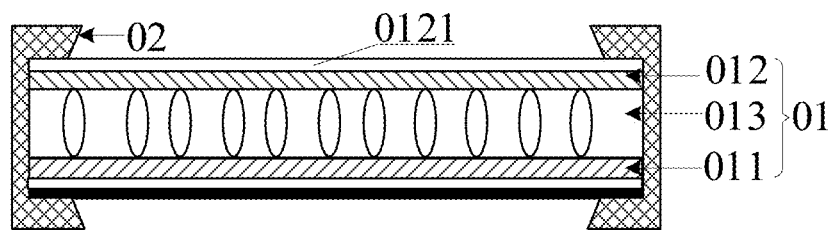
FIG. 2 is a cross-sectional view of the liquid crystal handwriting board shown in FIG. 1 at A-A'.

In some practices, referring to FIG. 1 and FIG. 2, FIG. 1 is a top view of a liquid crystal handwriting board according to some practices, and FIG. 2 is a cross-sectional view of the liquid crystal handwriting board shown in FIG. 1 at A-A'.

The liquid crystal handwriting board 00 generally includes: a liquid crystal panel 01 and an infrared positioning apparatus 02.

The liquid crystal panel 01 includes: a first substrate 011 and a second substrate 012 that are oppositely disposed, and a liquid crystal layer 013 disposed between the two. The first substrate 011 is generally provided with a plurality of pixel electrodes (not shown in drawings) arranged in an array, and the second substrate 012 is provided with a planar common electrode 0121. Liquid crystal molecules in the liquid crystal layer 013 are bistable liquid crystal molecules.

The infrared positioning apparatus 02 in the liquid crystal handwriting board 00 is disposed at a periphery of the liquid crystal panel 01, and the infrared positioning apparatus 02 is higher than a display face of the liquid crystal panel 01. The infrared positioning apparatus 02 emits infrared rays, such that the liquid crystal handwriting board 00 positions a position of an external object (such as a handwriting tool or an erasing tool) on the liquid crystal handwriting board 00 through the infrared rays emitted by the infrared positioning apparatus 02.

In the case that the liquid crystal handwriting board 00 is in a writing mode, the handwriting tool (such as a writing pen) applies a pressure to the liquid crystal panel 01, such that part of liquid crystal molecules in the liquid crystal layer 013 in the liquid crystal panel 01 are transformed from a focal cone texture to a planar texture under an action of the external pressure. In this way, the liquid crystal molecules transformed into the planar texture reflect the light of a wavelength (such as green light) in incident ambient light, such that the liquid crystal handwriting board 00 displays handwriting. In addition, in a writing process of the handwriting tool, a moving track of the handwriting tool is determined by the infrared positioning apparatus 02, so as to ensure that the liquid crystal handwriting board 00 generates image information corresponding to the handwriting based on the moving track. Subsequently, the liquid crystal handwriting board 00 sends the image information to other display devices (such as computers or mobile phones), such that other display devices also display the handwriting on the liquid crystal handwriting board 00.

In the case that the liquid crystal handwriting board 00 is in an erasing mode, the erasing tool (such as an eraser) moves on the liquid crystal handwriting board 00, and the liquid crystal handwriting board 00 determines the position of the erasing tool on the liquid crystal panel 01 through the infrared rays emitted by the infrared positioning apparatus 02, and then the to-be-erased region is determined from the liquid crystal handwriting board 00. Afterwards, the liquid crystal handwriting board applies a voltage to the pixel electrodes in the to-be-erased region, such that a voltage difference is formed between the pixel electrodes in the to-be-erased region and the common electrode 0121, and then the liquid crystal molecules in the to-be-erased region are rearranged under the action of the voltage difference, that is, the liquid crystal molecules are transformed from the planar texture to the focal cone texture. In this way, the liquid crystal molecules transformed into the focal cone texture transmit the incident ambient light, such that the to-be-erased region shows a background color (such as black or dark green), and then the handwriting in the to-be-erased region is erased.

However, when the infrared positioning apparatus 02 is integrated into the liquid crystal handwriting board 00, the infrared positioning apparatus 02 needs to be higher than the display face of the liquid crystal panel 01 to ensure normal operation of the infrared positioning apparatus 02, such that a thickness of the liquid crystal handwriting board 00 is greater, and a screen-to-body ratio is less.

Figure 3:
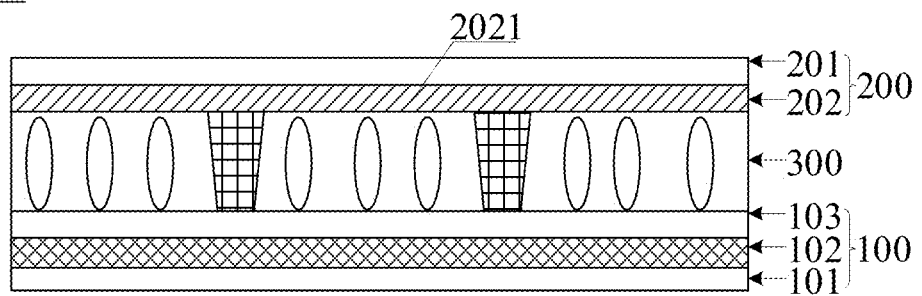
FIG. 3 is a schematic structural diagram of a liquid crystal handwriting board according to some embodiments of the present disclosure.

Referring to FIG. 3, FIG. 3 is a schematic structural diagram of a liquid crystal handwriting board according to some embodiments of the present disclosure. The liquid crystal handwriting board 000 includes: a first base plate 100 and a second base plate 200 that are oppositely disposed, and a liquid crystal layer 300 disposed between the first base plate 100 and the second base plate 200. The liquid crystal layer 300 includes bistable liquid crystal molecules. The liquid crystal layer 300 is a bistable liquid crystal molecular layer.

The first base plate 100 in the liquid crystal handwriting board 000 includes a first substrate 101, and an electromagnetic touch layer 102 and a pixel electrode layer 103 that are disposed on a side of the first substrate 101. Exemplarily, the electromagnetic touch layer 102 is closer to the first substrate 101 than the pixel electrode layer 103. The pixel electrode layer 103 is provided with a plurality of pixel electrodes 103a (not marked in FIG. 3, but marked in subsequent drawings) therein.

Figure 4:
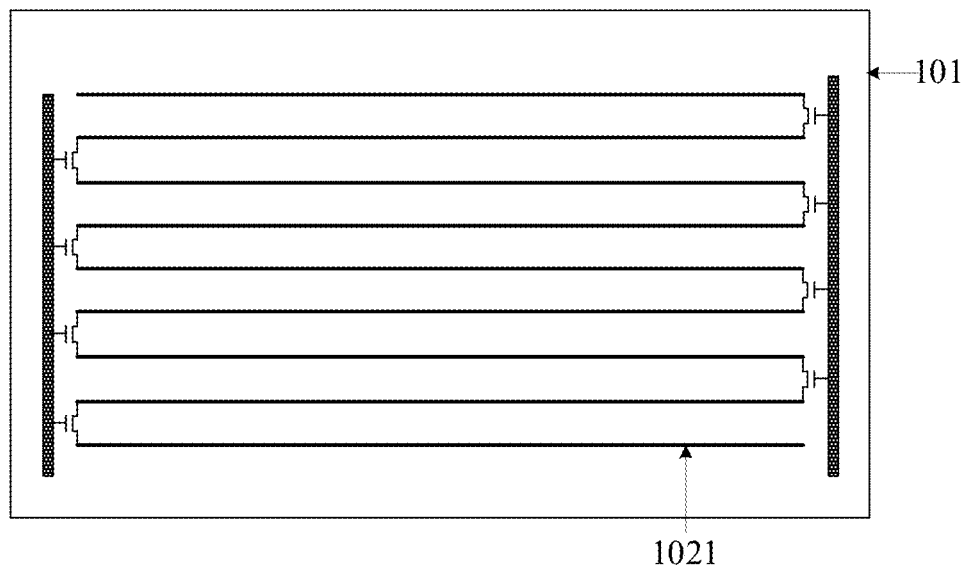
FIG. 4 is a top view of an electromagnetic touch layer according to some embodiments of the present disclosure.

In the present disclosure, for clearer structure of the electromagnetic touch layer, referring to FIG. 4, FIG. 4 is a top view of an electromagnetic touch layer according to some embodiments of the present disclosure. The electromagnetic touch layer 102 is provided with a plurality of electromagnetic signal lines 1021, and each two adjacent electromagnetic signal lines 1021 are connected in series. Each two adjacent electromagnetic signal lines 1021 are connected in series, the electromagnetic signal lines 1021 connected in series form a coil structure, and the coil structure forms an electromagnetic field after being loaded with an electromagnetic signal.

The second base plate 200 includes: a second substrate 201 and a common electrode layer 202 disposed on a side of the second substrate 201. The common electrode layer 202 is provided with a common electrode 2021 therein.

In the present disclosure, any one of the first substrate 101 and the second substrate 201 is a flexible substrate. The flexible substrate is disposed on a writing side of the liquid crystal handwriting board 000. The writing side of the liquid crystal handwriting board 000 refers to a display face of the liquid crystal handwriting board 000. In this way, the user applies a pressure to the flexible substrate from the writing side of the liquid crystal handwriting board 000, such that the bistable liquid crystal molecules in the liquid crystal layer 300 are transformed from the focal cone texture to the planar texture, and thus the liquid crystal handwriting board 000 displays the handwriting. For example, the embodiments of the present disclosure are illustrated by taking the second substrate 201 being the flexible substrate as an example.

Figure 5:
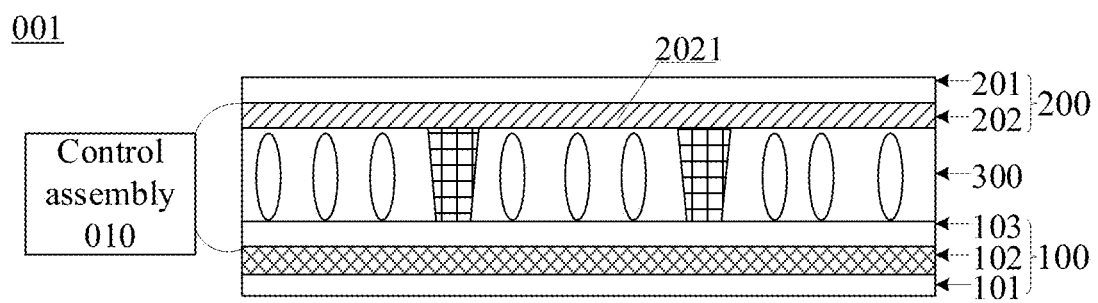
FIG. 5 is a schematic structural diagram of a handwriting apparatus according to some embodiments of the present disclosure.

In the embodiments of the present disclosure, in the case that the liquid crystal handwriting board shown in FIG. 3 is integrated in a handwriting apparatus, referring to FIG. 5, FIG. 5 is a schematic structural diagram of a handwriting apparatus according to some embodiments of the present disclosure. The handwriting apparatus 001 includes: a liquid crystal handwriting board 000 and a control assembly 010. The liquid crystal handwriting board 000 is the liquid crystal handwriting board shown in FIG. 3, and the control assembly 010 is electrically connected to the liquid crystal handwriting board 000. The control assembly is electrically connected to the electromagnetic touch layer 102, the pixel electrode layer 103, and the common electrode layer 202 in the liquid crystal handwriting board 000.

Thus, the control assembly 010 is configured to: in the case that the liquid crystal handwriting board 000 is in the erasing mode, determine position information of the to-be-erased region by the electromagnetic touch layer 102, and apply a pixel voltage to the pixel electrodes 103a in the to-be-erased region, such that a voltage difference is formed between the pixel electrodes 103a in the to-be-erased region and the common electrode layer 202.

In the embodiments of the present disclosure, the control assembly 010 is also configured to: in the case that the liquid crystal handwriting board 000 is in the writing mode, determine position information of the handwriting by the electromagnetic touch layer 102, and generate image information corresponding to the handwriting.

It should be noted that the handwriting apparatus 001 further includes: a changeover switch (not shown in FIG. 5) electrically connected to the control assembly 010, and the changeover switch is configured to control the liquid crystal handwriting board 000 to be switched between the erasing mode and the writing mode.

In the case that the liquid crystal handwriting board is in the writing mode, the handwriting tool (such as a writing pen) is configured to write on the liquid crystal handwriting board 000. In the case that the handwriting tool is in contact with the second base plate 200 in the liquid crystal handwriting board 000, and applies a pressure to the second base plate 200, part of the bistable liquid crystal molecules in the liquid crystal layer 300 in the liquid crystal handwriting board 000 are transformed from the focal cone texture to the planar texture under the action of the external pressure. Thus, the bistable liquid crystal molecules in the planar texture reflect the light of a wavelength (such as green light) in ambient light irradiated on the liquid crystal handwriting board 000, such that the liquid crystal handwriting board 000 displays the corresponding handwriting.

In the case that the liquid crystal handwriting board is in the erasing mode, the erasing tool (such as an eraser) is configured to erase the handwriting displayed on the liquid crystal handwriting board 000. The erasing tool is provided with a first coil structure. The electromagnetic touch layer 102 in the liquid crystal handwriting board 000 is provided with the electromagnetic signal lines 1021 connected in series, and the electromagnetic signal lines 1021 connected in series form the coil structure. Therefore, after one of such coil structure and the first coil structure of the erasing tool is loaded with an electromagnetic signal, the coil structure loaded with the electromagnetic signal forms an electromagnetic field. In this way, after the erasing tool is in contact with the second base plate 200 in the liquid crystal handwriting board 000, the other of such coil structure and the first coil structure of the erasing tool (that is, the coil structure not loaded with the electromagnetic signal) generates an induction current under the action of the electromagnetic field. The control assembly 010 in the handwriting apparatus 001 determines the position information of the erasing tool on the liquid crystal handwriting board 000 based on the induction current, and the position of the erasing tool on the liquid crystal handwriting board 000 is the position of the to-be-erased region. Afterwards, the control assembly 010 applies a voltage to the pixel electrodes in the to-be-erased region based on the position information of the to-be-erased region, such that the voltage difference is formed between the pixel electrodes in the to-be-erased region and the common electrode 2021. The liquid crystal molecules in the to-be-erased region in the liquid crystal handwriting board 000 are rearranged under the action of the voltage difference, that is, the liquid crystal molecules are transformed from the planar texture to the focal cone texture, such that a function of erasing the handwriting in the local region by the handwriting apparatus is achieved.

In the case that the handwriting tool has a second coil structure, the liquid crystal handwriting board 000 is also capable of saving the handwriting. The electromagnetic touch layer 102 in the liquid crystal handwriting board 000 is provided with the electromagnetic signal lines 1021 connected in series, and the electromagnetic signal lines 1021 connected in series form the coil structure. Therefore, after one of such coil structure and the second coil structure of the handwriting tool is loaded with an electromagnetic signal, the coil structure loaded with the electromagnetic signal forms an electromagnetic field. In this way, after the handwriting tool is in contact with the second base plate 200 in the liquid crystal handwriting board 000, the other of such coil structure and the second coil structure of the handwriting tool (that is, the coil structure not loaded with electromagnetic signal) generates an induction current under the action of the electromagnetic field. The control assembly 010 in the handwriting apparatus 001 determines the position information of the handwriting tool on the liquid crystal handwriting board 000 based on the induction current. Thus, in the writing process of the handwriting tool, the control assembly 010 determines the position information of the handwriting tool in contact with the second base plate 200 by the electromagnetic touch layer 102, so as to determine the position information of the handwriting, generate the image information corresponding to the handwriting. Thus, the handwriting apparatus 001 achieves the function of saving the handwriting. Subsequently, the control assembly 010 sends the image information to other display devices (such as computers or mobile phones), such that other display devices are also capable of displaying the handwriting on the liquid crystal handwriting board 000.

In the embodiments of the present disclosure, the electromagnetic touch layer 102 in the liquid crystal handwriting board 000 forms the coil structure, and the coil structure is cooperated with the first coil structure in the erasing tool or the second coil structure in the handwriting tool, such that the control assembly 010 in the handwriting apparatus 001 determines the position information of the erasing tool or the handwriting tool on the liquid crystal handwriting board 000 after the liquid crystal handwriting board 000 is integrated in the handwriting apparatus 001. Therefore, the handwriting apparatus achieves the function of locally erasing or saving the handwriting. Thus, compared with erasing or saving the handwriting using the infrared positioning apparatus in some practices, in the present disclosure, the infrared positioning apparatus is not required to be disposed in the liquid crystal handwriting board 000, such that the overall thickness of the liquid crystal handwriting board 000 is effectively reduced, and the screen-to-body ratio of the liquid crystal handwriting board 000 is improved.

In summary, the liquid crystal handwriting board according to the embodiments of the present disclosure includes: the first base plate and the second base plate that are oppositely disposed, and the liquid crystal layer disposed between the first base plate and the second base plate. The electromagnetic touch layer in the liquid crystal handwriting board is provided with the electromagnetic signal lines connected in series, and the electromagnetic signal lines connected in series form a coil structure. Therefore, such coil structure is cooperated with the first coil structure in the erasing tool or the second coil structure in the handwriting tool, such that the control assembly in the handwriting apparatus determines the position information of the erasing tool or the handwriting tool on the liquid crystal handwriting board after the liquid crystal handwriting board is integrated in the handwriting apparatus. In this way, the handwriting apparatus can realize the function of locally erasing or saving the handwriting. Thus, according to the present disclosure, the infrared positioning apparatus is not required to be disposed in the liquid crystal handwriting board, and only the electromagnetic touch layer integrated in the first base plate is required to realize the function of locally erasing or saving the handwriting, such that the overall thickness of the liquid crystal handwriting board and a width of a frame of the liquid crystal handwriting board are effectively reduced, and the screen-to-body ratio of the liquid crystal handwriting board is relatively great.

In the embodiments of the present disclosure, the electromagnetic touch layer 102 in the first base plate 100 has various structures, and the embodiments of the present disclosure are illustrated in the following two optional implementations.

Figure 6:
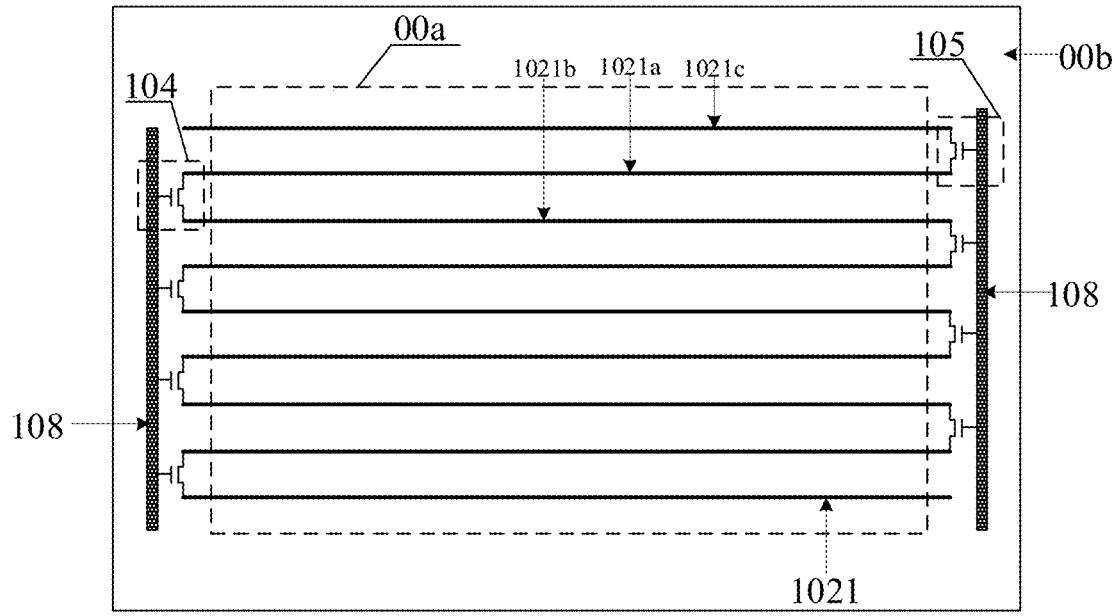
FIG. 6 is a top view of a first substrate according to some embodiments of the present disclosure.

In a first optional implementation, referring to FIG. 6, FIG. 6 is a top view of a first substrate according to some embodiments of the present disclosure. The first base plate 100 in the liquid crystal handwriting board 000 further includes: a plurality of first connection structures 104 and a plurality of second connection structures 105. The plurality of first connection structures 104 are all distributed on one side of the plurality of electromagnetic signal lines 1021, and the plurality of second connection structures 105 are all distributed on the other side of the plurality of electromagnetic signal lines 1021. The liquid crystal handwriting board 000 is provided with a display region 00a and a peripheral region 00b around the display region 00a. The plurality of first connection structures 104 and the plurality of second connection structures 105 are all disposed in the peripheral region 00b of the liquid crystal handwriting board 000.

One end of a first electromagnetic signal line 1021a is electrically connected to one end of a second electromagnetic signal line 1021b by one first connection structure 104, and the other end of the first electromagnetic signal line 1021a is electrically connected to one end of a third electromagnetic signal line 1021c by one second connection structure 105. The first electromagnetic signal line 1021a is any electromagnetic signal line in the plurality of electromagnetic signal lines 1021a, the second electromagnetic signal line 1021b is an electromagnetic signal line in the plurality of electromagnetic signal lines 1021 disposed on a side of the first electromagnetic signal line 1021a, and the third electromagnetic signal line 1021c is an electromagnetic signal line in the plurality of electromagnetic signal lines 1021 disposed on a side, distal from the second electromagnetic signal line 1021b, of the first electromagnetic signal line 1021a. The plurality of first connection structures 104 and the plurality of second connection structures 105 are all switches. In this way, in the case that the switches are turned on, the plurality of electromagnetic signal lines 1021 in the first base plate 100 are connected in series by the plurality of first connection structures 104 and the plurality of second connection structures 105, such that the electromagnetic signal lines 1021 connected in series form a coil structure. In the case that the switches are turned off, the plurality of electromagnetic signal lines 1021 in the first base plate 100 are not electrically connected, and do not form a coil structure.

In the present disclosure, there are various connection modes between the plurality of electromagnetic signal lines 1021 and the connection structures, and the embodiments of the present disclosure are only illustrated by taking the following two optional connection modes as an example.

In a first optional connection mode, as shown in FIG. 6, the first electromagnetic signal line 1021a, the second electromagnetic signal line 1021b, and the third electromagnetic signal line 1021c are three adjacent electromagnetic signal lines 1021. In this way, any two adjacent electromagnetic signal lines 1021 are connected in series by the first connection structures 104 or the second connection structures 105.

Figure 7:
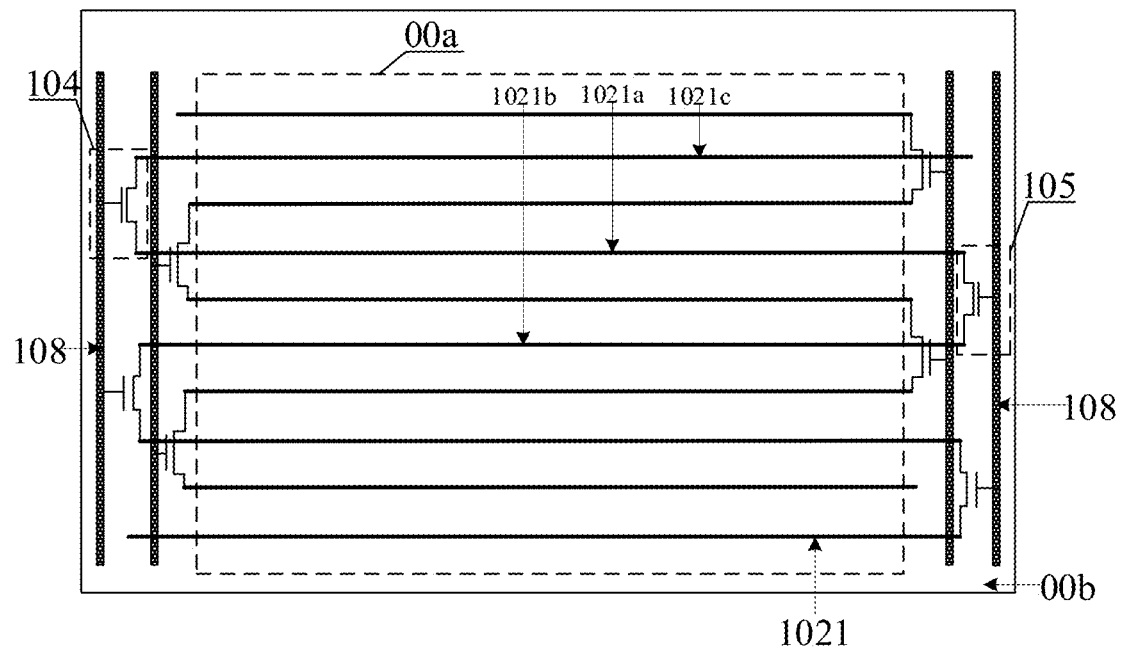
FIG. 7 is a top view of another first substrate according to some embodiments of the present disclosure.

In a second optional connection mode, referring to FIG. 7, FIG. 7 is a top view of a first substrate according to some embodiments of the present disclosure. The first electromagnetic signal line 1021a, the second electromagnetic signal line 1021b, and the third electromagnetic signal line 1021c are not adjacent electromagnetic signal lines 1021. Exemplarily, at least one electromagnetic signal line 1021 is provided between any two electromagnetic signal lines 1021 in the first electromagnetic signal line 1021a, the second electromagnetic signal line 1021b, and the third electromagnetic signal line 1021c. In one possible implementation, as shown in FIG. 7, odd-numbered rows of electromagnetic signal lines 1021 in the plurality of electromagnetic signal lines 1021 are connected in series by the first connection structures 104 and the second connection structures 105, and/or even-numbered rows of electromagnetic signal lines 1021 in the plurality of electromagnetic signal lines 1021 are connected in series by the first connection structures 104 and the second connection structures 105. In other possible implementations, the first electromagnetic signal lines 1021a, the second electromagnetic signal lines 1021b, and the third electromagnetic signal lines 1021c have other arrangements, which are not limited in the embodiments of the present disclosure.

Figure 8:
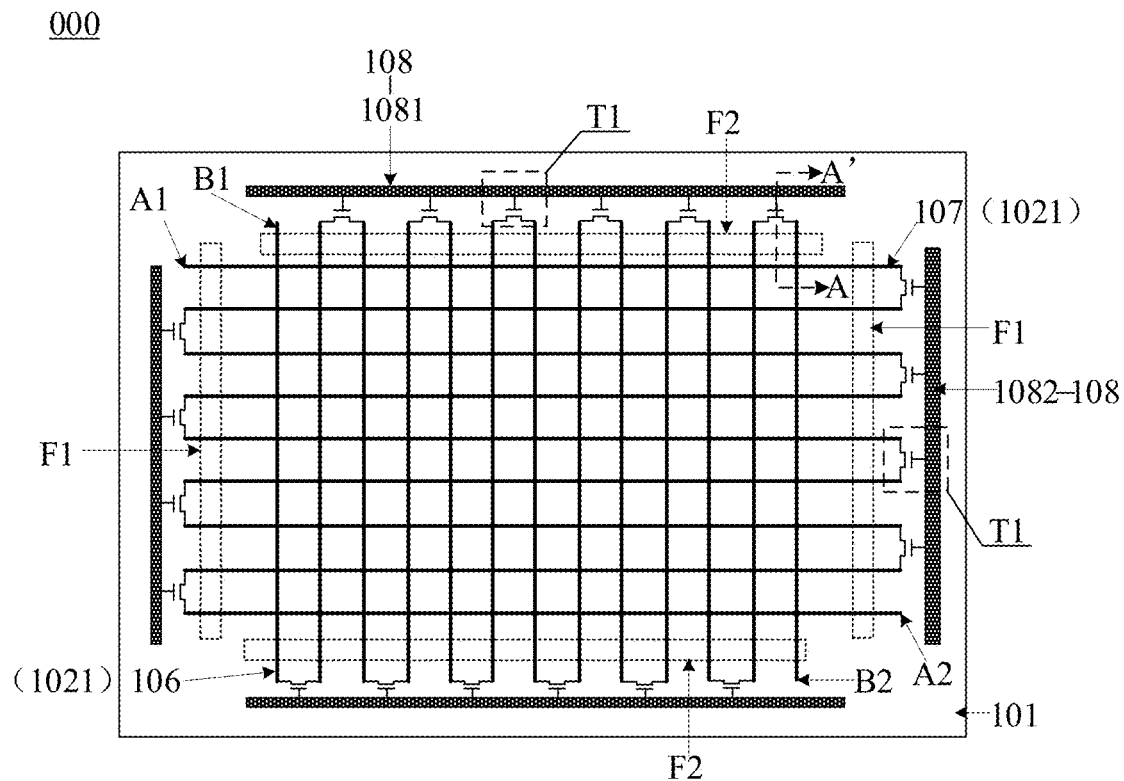
FIG. 8 is a top view of yet another first substrate according to some embodiments of the present disclosure.
Figure 9:
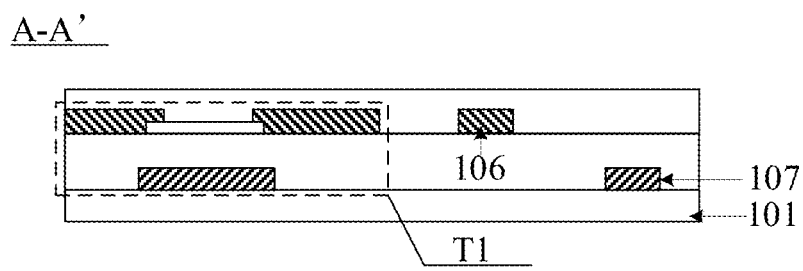
FIG. 9 is a schematic structural diagram at A-A' shown in FIG. 8.

In the embodiments of the present disclosure, referring to FIG. 8 and FIG. 9, FIG. 8 is a top view of another first substrate according to some embodiments of the present disclosure, and FIG. 9 is a schematic structural diagram at A-A' shown in FIG. 8. The first base plate 100 in the liquid crystal handwriting board 000 further includes: a plurality of data lines 106 and a plurality of gate lines 107. The plurality of data lines 106 extend in a first direction, and the plurality of gate lines 107 extend in a second direction different from the first direction. Extension directions of the plurality of data lines 106 and the plurality of gate lines 107 refer to the extension directions of the whole data lines 106 and gate lines 107. Exemplarily, the extension direction of the data lines 106 is perpendicular to the extension direction of the gate lines 107. The plurality of electromagnetic signal lines 1021 in the electromagnetic touch layer 102 are at least one of the data lines 106 and the gate lines 107.

In this case, metal wires are not required to be increased and taken as the electromagnetic signal lines 1021 in the liquid crystal handwriting board 000, and the electromagnetic signal lines 1021 shares at least one of the plurality of data lines 106 and the plurality of gate lines 107, such that a manufacturing process of the liquid crystal handwriting board 000 is simple, and a manufacturing cost is reduced. The data lines 106 and the gate lines 107 are disposed in different layers. It should be noted that the arrangement of two conductive structures in different layers in the embodiments of the present disclosure means that an insulating layer is present between two conductive layers of the two conductive structures. Exemplarily, as shown in FIG. 8, the conductive layer of the plurality of data lines 106 and the conductive layer of the plurality of gate lines 107 are not the same conductive layer, and an insulating layer is present between the conductive layer of the plurality of data lines 106 and the conductive layer of the plurality of gate lines 107.

It should also be noted that in FIG. 8, the data lines 106 and the gate lines 107 are taken as the electromagnetic signal lines 1021. In this case, the electromagnetic touch layers 102 are disposed on a side of the first substrate 101 proximal to the second base plate 200, and two electromagnetic touch layers 102 are present in the first base plate 100. The electromagnetic signal lines 1021 in one electromagnetic touch layer 102 are the data lines 106, and the electromagnetic signal lines 1021 in the other electromagnetic touch layer 102 are the gate lines 107. In other possible implementations, there is one electromagnetic touch layer 102, and the electromagnetic signal lines 1021 in such electromagnetic touch layer 102 are the gate lines 107 or the data lines 106, which is not limited in the embodiments of the present disclosure.

In the embodiments of the present disclosure, the switch includes: a first electrode, a second electrode and a control electrode. The control electrode is configured to conduct the first electrode and the second electrode upon receiving a conduction signal. In the case that a high-level voltage is applied to the control electrode, the first electrode and the second electrode are conducted, such that the switch is turned on. In the case that a low-level voltage is applied to the control electrode, the first electrode and the second electrode are not conducted, such that the switch is turned off. Exemplarily, the switch is a thin film transistor. In this way, the control electrode is a gate electrode of the thin film transistor, and the first electrode and the second electrode are respectively a source electrode and a drain electrode of the thin film transistor. In other possible implementations, the switch is also a switch circuit formed by a plurality of thin film transistors, which is not limited by the embodiments of the present disclosure. The present disclosure is only illustrated by taking the thin film transistor being the switch as an example.

It should be noted that the thin film transistor is a top gate type thin film transistor or a bottom gate type thin film transistor, which is not limited in the embodiments of the present disclosure. The thin film transistor shown in FIG. 9 is illustrated by taking the bottom gate type thin film transistor as an example. It should also be noted that the following switches are collectively referred to as thin film transistors T1 to facilitate the description in the following embodiments.

The first electrode of the switch and the second electrode of the switch are respectively electrically connected to end parts of two adjacent electromagnetic signal lines 1021. The first base plate 100 further includes: at least two switch control lines 108. In the at least two switch control lines 108, one switch control line 108 is electrically connected to the control electrodes of at least part of the first connection structures 104, and the other switch control line 108 is electrically connected to the control electrodes of at least part of the second connection structures 105. The at least two switch control lines 108 are electrically connected to the control electrodes of a plurality of switches. In this way, the liquid crystal handwriting board 000 conducts the first electrodes and the second electrodes of the switches through the plurality of switch control lines 108, such that the plurality of electromagnetic signal lines 1021 are conducted, or the plurality of electromagnetic signal lines 1021 are dis-conducted. It should be noted that the two switch control lines 108 are electrically connected. In this way, the liquid crystal handwriting board 000 simultaneously controls the two switch control lines 108 to be conducted or dis-conducted by a controller.

In the embodiments of the present disclosure, as shown in FIG. 6 and FIG. 7, in the case that all the first connection structures 104 and the second connection structures 105 are turned on under control of the at least two switch control lines 108, the electromagnetic signal lines 1021 electrically connected to the first connection structures 104 and the second connection structures 105 are sequentially connected in series. In the case that all the first connection structures 104 and the second connection structures 105 are turned off under control of the at least two switch control lines 108, the electromagnetic signal lines 1021 electrically connected to the first connection structures 104 and the second connection structures 105 are not electrically connected.

In this case, in the case that the at least two switch control lines 108 are both loaded with a first level for turning on the switches, the switches are in an on state. In this way, the plurality of electromagnetic signal lines 1021 are connected in series by the thin film transistors T1, such that the electromagnetic signal lines 1021 connected in series form a coil structure. Thus, the positioning function for the erasing tool or the handwriting tool is achieved by subsequently matching the coil structure with the first coil structure in the erasing tool or the second coil structure in the handwriting tool.

In the case that the at least two switch control lines 108 are loaded with a second level for turning off the switches, the switches are in an off state. In this way, the electromagnetic signal lines 1021 are not electrically connected. Thus, the plurality of data lines 106 and the plurality of gate lines 107 work normally subsequently, such that the function of erasing the handwriting displayed by the liquid crystal handwriting board 000 is achieved.

In the embodiments of the present disclosure, the at least two switch control lines 108 include: N groups of switch control lines. N is an integer greater than 1. One group of switch control lines 108 includes: one switch control line 108 for being electrically connected to the control electrodes of at least part of the plurality of first connection structures 104, and one switch control line 108 for being electrically connected to the control electrodes of at least part of the plurality of second connection structures 105. The control electrodes of adjacent first connection structures 104 are respectively electrically connected to different groups of switch control lines 108, and the control electrodes of adjacent second connection structures 105 are respectively electrically connected to different groups of switch control lines 108.

In the present disclosure, as shown in FIG. 7, the liquid crystal handwriting board 000 includes: N adjacently disposed first connection structures 104 and N adjacently disposed second connection structures 105.

The N adjacently disposed first connection structures 104 are respectively electrically connected to different groups of switch control lines 108, and the N adjacently disposed second connection structures 105 are respectively electrically connected to different groups of switch control lines 108. In this way, different groups of switch control lines 108 control the electromagnetic signal lines 1021 correspondingly connected thereto by the connection structures. Exemplarily, in the case that there are two groups of switch control lines 108 in the first base plate 100, one switch control line 108 in one group of switch control lines 108 is electrically connected to the control electrodes of the odd-numbered rows of first connection structures 104, and the other switch control line 108 in the one group of switch control lines 108 is electrically connected to the control electrodes of the odd-numbered rows of second connection structures 105; one switch control line 108 in the other group of switch control lines 108 is electrically connected to the control electrodes of the even-numbered rows of first connection structures 104, and the other switch control line 108 in the other group of switch control lines 108 is electrically connected to the control electrodes of the even-numbered rows of second connection structures 105. In this way, in the case that the odd-numbered rows of first connection structures 104 and the odd-numbered rows of second connection structures 105 are turned on under control of one group of switch control lines 108, the odd-numbered rows of electromagnetic signal lines 1021 are sequentially connected in series, such that the odd-numbered rows of electromagnetic signal lines 1021 form a coil structure. In the case that the even-numbered rows of first connection structures 104 and the even-numbered rows of second connection structures 105 are turned on under control of the other group of switch control lines 108, the even-numbered rows of electromagnetic signal lines 1021 are sequentially connected in series, such that the even-numbered rows of electromagnetic signal lines 1021 form a coil structure. In this way, a plurality of coil structures are formed in the first base plate 100, and resistances of the coil structures are smaller, which is more conducive to subsequent electromagnetic touch.

In the embodiments of the present disclosure, the N groups of switch control lines 108 are electrically connected to the same controller, such that the liquid crystal handwriting board 000 controls the groups of switch control lines 108 by one controller. In some embodiments, each group of switch control lines 108 in the N groups of switch control lines 108 is electrically connected to a controller, such that the liquid crystal handwriting board 000 controls the groups of switch control lines 108 by different controllers. Exemplarily, the liquid crystal handwriting board 000 regulates and controls the resistances of the coil structures in the first base plate 100 by various controllers. Thus, the liquid crystal handwriting board 000 adjusts the positioning accuracy of subsequent electromagnetic touch by adjusting the resistances of the coil structures.

In the present disclosure, in at least part of the region of the liquid crystal handwriting board 000, the N adjacently disposed first connection structures 104 are equally spaced apart, and the N adjacently disposed second connection structures 105 are equally spaced apart.

It should be noted that in the case shown in FIG. 7, the even-numbered rows of electromagnetic signal lines 1021 form a coil structure, and the coil structure is provided with two signal ports. The odd-numbered rows of electromagnetic signal lines 1021 form a coil structure, and the coil structure is also provided with two signal ports. These signal ports partially serve as signal input ports and partially serve as signal output ports. For example, the signal ports of the coil structure formed by the even-numbered rows of electromagnetic signal lines 1021 serve as the signal input ports, and the signal ports of the coil structure formed by the odd-numbered rows of electromagnetic signal lines 1021 serve as the signal output ports. In this way, the liquid crystal handwriting board 000 determines the position information of the erasing tool or the handwriting tool on the liquid crystal handwriting board 000 by the first method in the following embodiments.

In the embodiments of the present disclosure, as shown in FIG. 6, the at least two switch control lines 108 include two switch control lines 108 disposed in the same layer. In the two switch control lines 108, one switch control line 108 is electrically connected to the control electrodes of all the first connection structures 104, and the other switch control line 108 is electrically connected to the control electrodes of all the second connection structures 105. In this way, the group of switch control lines 108 control all the connection structures in the display panel, such that electromagnetic signal lines 1021 form the coil structures.

It should be noted that the data lines in the plurality of data lines 106 serving as the electromagnetic signal lines 1021 are called multiplexed data lines, and the gate lines 107 in the plurality of gate lines 107 serving as the electromagnetic signal lines 1021 are called multiplexed gate lines. The multiplexed data lines mean that the plurality of data lines 106 serve as the electromagnetic signal lines 1021 to form the coil structure, and also serve as the data lines 106 for the liquid crystal handwriting board 000 to perform the erasing operation. The multiplexed gate lines mean that the plurality of gate lines 107 serve as the electromagnetic signal lines 1021 to form the coil structure, and also serve as the gate lines 107 for the liquid crystal handwriting board 000 to perform the erasing operation. The data lines 106 in at least part of the region of the liquid crystal handwriting board 000 all serve as the multiplexed data lines, and/or the gate lines 107 in at least part of the region of the liquid crystal handwriting board 000 all serve as the multiplexed gate lines. Exemplarily, the plurality of multiplexed data lines and the plurality of multiplexed gate lines are all uniformly distributed in the display region 00a.

It should also be noted that the embodiments of the present disclosure are illustrated by taking the case where the data lines 106 in the first base plate 100 all serve as the multiplexed data lines and the gate lines 107 in the first base plate 100 all serve as the multiplexed gate lines as an example. In other possible implementations, part of the data lines 106 in the first base plate 100 serve as the multiplexed data lines, and/or part of the gate lines 107 in the first base plate 100 serve as the multiplexed gate lines, which is not limited in the embodiments of the present disclosure.

In the present disclosure, as shown in FIG. 8, the at least two switch control lines 108 in the first base plate 100 include: two first switch control lines 1081 and two second switch control lines 1082, and an extension direction of the first switch control lines 1081 is the second direction, that is, parallel to the extension direction of the gate lines 107. An extension direction of the second switch control lines 1082 is the first direction, that is, parallel to the extension direction of the data lines 106.

The plurality of data lines 106 are arranged between the two first switch control lines 1081, and the first switch control lines 1081 are electrically connected to the control electrodes of the switches for connecting two adjacent multiplexed data lines. The plurality of gate lines 107 are arranged between the two second switch control lines 1082, and the second switch control lines 1082 are electrically connected to the control electrodes of the switches for connecting two adjacent multiplexed gate lines. In this way, the electromagnetic touch layer 102 where the electromagnetic signal lines 1021 are the data lines is controlled to work through the two first switch control lines 1081, and the electromagnetic touch layer 102 where the electromagnetic signal lines 1021 are f the gate lines is controlled to work through the two second switch control lines 1082.

In the embodiments of the present disclosure, the two electromagnetic touch layers 102 in the liquid crystal handwriting board 000 are respectively a first electromagnetic touch layer and a second electromagnetic touch layer. It should be noted that, in order to facilitate the following description, the first electromagnetic touch layer is determined as the electromagnetic touch layer where the electromagnetic signal lines 1021 are the gate lines, and the second electromagnetic touch layer is determined as the electromagnetic touch layer where the electromagnetic signal lines 1021 are the data lines. In other possible implementations, the first electromagnetic touch layer and the second electromagnetic touch layer are exchanged, which is not limited in the embodiments of the present disclosure.

After the liquid crystal handwriting board 000 is integrated into the handwriting apparatus 001, the handwriting apparatus 001 is cooperated with the first coil structure in the erasing tool to realize positioning of the erasing tool, and is also cooperated with the second coil structure in the handwriting tool to realize positioning of the handwriting tool. In the case that the erasing tool or the handwriting tool needs to be positioned, it is necessary to connect the electromagnetic signal lines 1021 in the first electromagnetic touch layer in series to form the coil structure in the first electromagnetic touch layer, and it is also necessary to connect the electromagnetic signal lines 1021 in the second electromagnetic touch layer in series to form the coil structure in the second electromagnetic touch layer. Moreover, it is necessary to load an electromagnetic signal on the first electromagnetic touch layer or the second electromagnetic touch layer, or to receive an induction signal by the first electromagnetic touch layer and/or the second electromagnetic touch layer.

Therefore, the first electromagnetic touch layer and the second electromagnetic touch layer both have two signal ports. These signal ports partially serve as signal input ports and partially serve as signal output ports. Or, these signal ports serve as the signal output ports simultaneously. Therefore, the embodiments of the present disclosure provide the following two methods for determining the position information of the erasing tool or the handwriting tool on the liquid crystal handwriting board 000.

In a first method, two signal ports (A1, A2) in the first electromagnetic touch layer are insulated from two signal ports (B1, B2) in the second electromagnetic touch layer, the two signal ports (A1, A2) in the first electromagnetic touch layer are both signal input ports, and the signal ports (B1, B2) in the second electromagnetic touch layer are both signal output ports.

In this case, neither the first coil structure of the erasing tool nor the second coil structure of the handwriting tool is loaded with the electromagnetic signal. That is, the erasing tool and the handwriting tool are both passively driven, and the first coil structure and the second coil structure do not actively generate the electromagnetic field. By simultaneously loading the electromagnetic signal on the two signal ports (A1, A2) in the first electromagnetic touch layer, the coil structure in the first electromagnetic touch layer generates the electromagnetic field. In the case that the liquid crystal handwriting board 000 is in the erasing mode, and the erasing tool moves on the liquid crystal handwriting board 000, an induction current is generated in the first coil structure of the erasing tool, and then the first coil structure generates a new electromagnetic field. Under the action of the new electromagnetic field, the coil structure in the second electromagnetic touch layer generates an induction signal, and the induction signal is output through the two signal ports (B1, B2) in the second electromagnetic touch layer. Subsequently, the control assembly 010 determines the position information of the erasing tool on the liquid crystal handwriting board based on the induction signal output by the two signal ports (B1, B2) in the second electromagnetic touch layer. It should be noted that, in order to facilitate the description, the embodiments of the present disclosure are illustrated by taking the case of determining the position information of the erasing tool as an example, the method for determining the position information of the handwriting tool is basically the same as the method for determining the position information of the erasing tool, which is not repeated herein.

Figure 10:
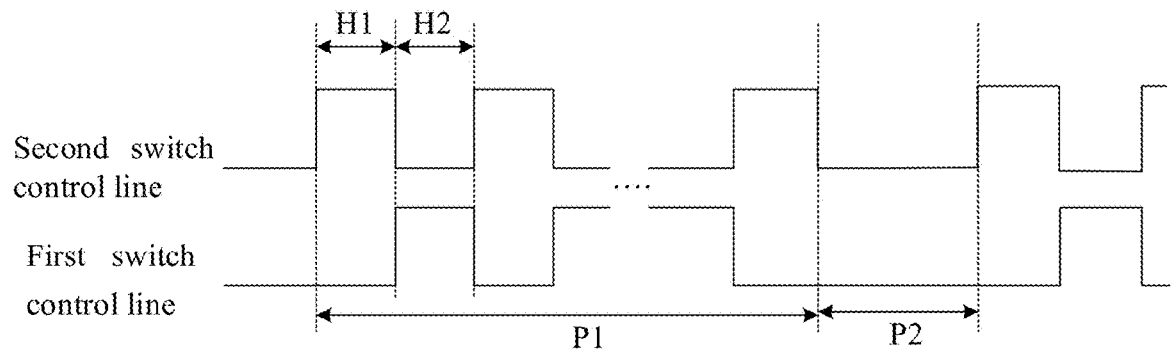
FIG. 10 is a schematic diagram of timing signals loaded on a first switch control line and a second switch control line according to some embodiments of the present disclosure.

Exemplarily, referring to FIG. 10, FIG. 10 is a schematic diagram of timing signals loaded on the first switch control line and the second switch control line according to some embodiments of the present disclosure. The handwriting apparatus 001 simultaneously applies a second scan signal to the two second switch control lines 1082 and a first scan signal to the two first switch control lines 1081. In the case that the liquid crystal handwriting board 000 is in the erasing mode, the first scan signal and the second scan signal applied by the handwriting apparatus 001 are respectively divided into two stages: a positioning stage P1 and an erasing stage P2.

In the positioning stage P1, the first scan signal and the second scan signal are both periodic signals including a plurality of first levels and a plurality of second levels that are in an overlapped arrangement. One of the first scan signal and the second scan signal is at the first level, and the other of the first scan signal and the second scan signal is at the second level. That is, in the case that the first scan signal is at the first level, the second scan signal is at the second level; in the case that the first scan signal is at the second level, the second scan signal is at the first level. In the case that the second scan signal is at the first level, and the first scan signal is at the second level, the coil structure is formed in the first electromagnetic touch layer, but no coil structure is formed in the second electromagnetic touch layer, and the electromagnetic signal needs to be input to the two signal ports (A1, A2) of the first electromagnetic touch layer simultaneously. The stage is called a driving stage H1. In the case that the second scan signal is at the second level, and the first scan signal is at the first level, no coil structure is formed in the first electromagnetic touch layer, but the coil structure is formed in the second electromagnetic touch layer, and the induction signal needs to be received through the two signal ports (B1, B2) of the second electromagnetic touch layer simultaneously. The stage is called an induction stage H2. Thus, in the positioning stage P1, the position of the erasing tool is positioned by setting a plurality of driving stages H1 and a plurality of induction stages H2 that are alternately distributed.

In the erasing stage P2, the first scan signal and the second scan signal are both constant signals. For example, both the first scan signal and the second scan signal are at the second level. In this way, all switches are ensured to be in the off state, such that the plurality of data lines 106 and the plurality of gate lines 107 operate normally. Subsequently, in the erasing stage P2, the handwriting in a region in contact with the erasing tool is locally erased by controlling the plurality of data lines 106 and the plurality of gate lines 107.

It should be noted that the first level and the second level only represent that the level of the signal has two states, and do not represent that the first level or the second level has a specific value in the context. Exemplarily, in the case that the thin film transistors T1 are all N-type switch transistors, the first level represents a high level, and the second level may represent a low level. The N-type switch transistors are turned on in the case that the gate electrodes are at the high level, and turned off in the case that the gate electrodes are at the low level.

In this case, when the liquid crystal handwriting board 000 is in the erasing mode, and a passively driven erasing tool is used, in the driving stage H1 in the positioning stage P1, the second scan signal loaded by the handwriting apparatus 001 on the two second switch control lines 1082 is at the first level, and the first scan signal loaded by the handwriting apparatus 001 on the two first switch control lines 1081 is at the second level. In this way, the plurality of multiplexed gate lines in the first electromagnetic touch layer are connected in series to form a coil structure, and the plurality of multiplexed data lines in the second electromagnetic touch layer are not connected in series. In this case, the electromagnetic signal is input to the two signal ports (A1, A2) in the first electromagnetic touch layer, such that the coil structure in the first electromagnetic touch layer generates an electromagnetic field. Afterwards, in the case that the erasing tool moves on the liquid crystal handwriting board, an induction current is generated in the first coil structure of the erasing tool, and the first coil structure generates a new electromagnetic field. Then, in the induction stage H2 in the positioning stage P1, the second scan signal loaded by the handwriting apparatus 001 on the two second switch control lines 1082 is at the second level, and the first scan signal loaded by the handwriting apparatus 001 on the two first switch control lines 1081 is at the first level. In this way, the plurality of multiplexed data lines in the second electromagnetic touch layer are connected in series to form a coil structure, and the plurality of multiplexed gate lines in the first electromagnetic touch layer are not connected in series. Thus, the coil structure generates an induction signal under the action of the new electromagnetic field generated in the first coil structure of the erasing tool, and the induction signal is output through the two signal ports (B1, B2) in the second electromagnetic touch layer. Subsequently, the control assembly 010 determines the position information of the erasing tool on the liquid crystal handwriting board 000 based on the induction signal output by the two signal ports (B1, B2) in the second electromagnetic touch layer.

In the embodiments of the present disclosure, after the position information of the erasing tool is determined by the liquid crystal handwriting board 000, in the erasing stage P2, the first scan signal loaded by the handwriting apparatus 001 on the two first switch control lines 1081 is at the second level, and the second scan signal loaded by the handwriting apparatus 001 on the two second switch control lines 1082 is at the second level. That is, the electromagnetic signal lines 1021 in the liquid crystal handwriting board 000 are not electrically connected, and the plurality of data lines 106 and the plurality of gate lines 107 work normally. In this way, the control assembly 010 applies a voltage to the pixel electrodes in the to-be-erased region based on the position information of the to-be-erased region, such that the handwriting in the to-be-erased region is erased.

In the present disclosure, after the liquid crystal handwriting board 000 determines the position information of the erasing tool, the liquid crystal handwriting board 000 ensures the accurate position information of the erasing tool on the liquid crystal handwriting board 000 by setting the plurality of driving stages H1 and the plurality of induction stages H2 to be alternately distributed in the positioning stage P1. Accordingly, in the case that the liquid crystal handwriting board 000 is in the writing mode, the position information of the handwriting tool on the liquid crystal handwriting board 000 is determined more accurately. Subsequently, the control assembly 010 generates greater image information corresponding to the handwriting based on the detailed position information of the handwriting.

It should be noted that the liquid crystal handwriting board 000 firstly records the induction signals output by the second electromagnetic touch layer at various positions in the liquid crystal handwriting board 000 through a standard passively driven auxiliary tool (such as a stylus or an eraser) including a coil structure. That is, the corresponding relationship between the contact position of the auxiliary tool on the liquid crystal handwriting board 000 and the induction signal generated at the position is acquired. The standard passively driven auxiliary tool including a coil structure refers to a reference tool meeting that the liquid crystal handwriting board 000 works by the electromagnetic touch layer. Thus, in the case that the erasing tool or the handwriting tool moves on the liquid crystal handwriting board 000, the liquid crystal handwriting board 000 determines the position information of the erasing tool or handwriting tool on the liquid crystal handwriting board 000 based on the induction signal output by the two signal ports (B1, B2) in the second electromagnetic touch layer and the previously determined corresponding relationship.

It should also be noted that the part of the first base plate 100 in the peripheral region 00b is also provided with a binding region. The binding region is provided with a plurality of gate line driving units F1 and a plurality of data line driving units F2. The gate line driving units F1 are configured to be bound to a gate line driving chip. In this way, the liquid crystal handwriting board 000 applies an electrical signal to the plurality of gate lines 107 through the gate line driving units F1. The data line driving units F2 are configured to be bound to a data line driving chip. In this way, the liquid crystal handwriting board 000 applies an electric signal to the plurality of data lines 106 through the data line driving units F2. The two signal ports (A1, A2) in the first electromagnetic touch layer are electrically connected to the gate line driving units F1, such that the liquid crystal handwriting board 000 applies the electromagnetic signal to the signal ports (A1, A2) through the gate line driving units F1. The two signal ports (B1, B2) in the second electromagnetic touch layer are electrically connected to the data line driving units F2, such that the liquid crystal handwriting board 000 applies the electromagnetic signal to the signal ports (B1, B2) through the data line driving units F2.

Figure 11:
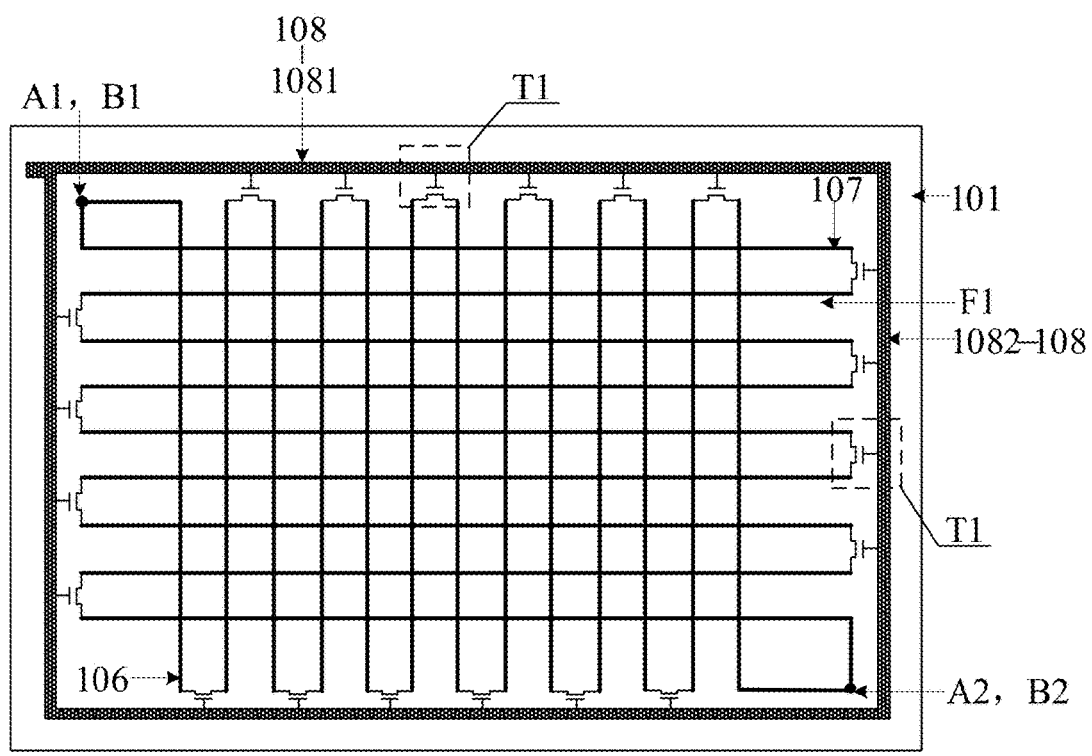
FIG. 11 is a top view of yet another first substrate according to some embodiments of the present disclosure.

In a second method, referring to FIG. 11, FIG. 11 is a top view of yet another first substrate according to the embodiments of the present disclosure. The two signal ports (A1, A2) in the first electromagnetic touch layer are respectively electrically connected to the two signal ports (B1, B2) in the second electromagnetic touch layer, and the two signal ports (A1, A2) in the first electromagnetic touch layer and the two signal ports (B1, B2) in the second electromagnetic touch layer are all signal output ports.

In this case, the first coil structure of the erasing tool and the second coil structure of the handwriting tool are both loaded with the electromagnetic signal, that is, the erasing tool and the handwriting tool are both actively driven, and the first coil structure and the second coil structure actively generates the electromagnetic fields. The second scan signal loaded by the handwriting apparatus 001 on the two second switch control lines 1082 is at the first level, and the first scan signal loaded by the handwriting apparatus 001 on the two first switch control lines 1081 is at the first level, such that the plurality of multiplexed gate lines in the first electromagnetic touch layer and the plurality of multiplexed data lines in the second electromagnetic touch layer are connected in series to form a coil structure. In the case that the erasing tool moves on the liquid crystal handwriting board, an induction signal is generated in the coil structure due to the electromagnetic field generated by the first coil structure of the erasing tool, and the induction signal is output through the signal ports (A1, B1) and the signal ports (A2, B2). Subsequently, the control assembly 010 determines the position information of the erasing tool on the liquid crystal handwriting board based on the induction signal output by the two signal ports (A1, B1) and the signal ports (A2, B2). It should be noted that, in order to facilitate the description, the embodiments of the present disclosure are illustrated by taking the case of determining the position information of the erasing tool as an example, the method for determining the position information of the handwriting tool is basically the same as the method for determining the position information of the erasing tool, which is not repeated herein.

In the present disclosure, in the case that the plurality of multiplexed gate lines in the first electromagnetic touch layer and the plurality of multiplexed data lines in the second electromagnetic touch layer are connected in series, the coil structure formed in the liquid crystal handwriting board 000 is a three-dimensional coil. In this way, in the case that the erasing tool moves on the liquid crystal handwriting board, the induction current generated in the three-dimensional coil structure is greater due to the electromagnetic field generated in the first coil structure of the erasing tool, such that the induction signal output by the signal ports (A1, B1) and the signal ports (A2, B2) is stronger. Thus, the position information of the erasing tool on the liquid crystal handwriting board 000 subsequently determined by the subsequent control assembly 010 is more accurate, and a local erasing effect of the liquid crystal handwriting board 000 is greater. Accordingly, in the case that the liquid crystal handwriting board 000 is in the writing mode, the position information of the handwriting tool on the liquid crystal handwriting board 000 is determined more accurately, such that the effect of the handwriting saved by the liquid crystal handwriting board 000 is also greater.

In the embodiments of the present disclosure, after the position information of the erasing tool is determined by the liquid crystal handwriting board 000, the first scan signal loaded by the handwriting apparatus 001 on the two first switch control lines 1081 is at the second level, and the second scan signal loaded by the handwriting apparatus 001 on the two second switch control lines 1082 is at the second level. That is, the electromagnetic signal lines 1021 in the liquid crystal handwriting board 000 are not electrically connected, and the plurality of data lines 106 and the plurality of gate lines 107 work normally. In this way, the control assembly 010 applies a voltage to the pixel electrodes in the region to be erased based on the position information of the to-be-erased region, such that the handwriting in the to-be-erased region is erased.

It should be noted that the liquid crystal handwriting board 000 firstly records the induction signals output by the first electromagnetic touch layer and the second electromagnetic touch layer at various positions in the liquid crystal handwriting board 000 through a standard actively driven auxiliary tool (such as a stylus or an eraser) including a coil structure. That is, a corresponding relationship between the contact position of the auxiliary tool on the liquid crystal handwriting board 000 and the induction signal generated at the position is acquired. The standard actively driven auxiliary tool including a coil structure refers to a reference tool meeting that the liquid crystal handwriting board 000 works by the electromagnetic touch layers. Thus, in the case that the erasing tool or the handwriting tool moves on the liquid crystal handwriting board 000, the liquid crystal handwriting board 000 determines the position information of the erasing tool or the handwriting tool on the liquid crystal handwriting board 000 based on the induction signal output by the two signal ports (A1, B1) and (A2, B2) and the previously determined corresponding relationship.

In the embodiments of the present disclosure, as shown in FIG. 11, in the case that the two signal ports (A1, A2) in the first electromagnetic touch layer are respectively electrically connected to the two signal ports (B1, B2) in the second electromagnetic touch layer, in some possible implementations, two ends of one first switch control line 1081 are respectively electrically connected to one ends of the two second switch control lines 1082, and two ends of one second switch control line 1082 are respectively connected to one ends of the two first switch control lines. In this way, the liquid crystal handwriting board 000 simultaneously applies the electrical signal to the two second switch control lines 1082 and the two first switch control lines 1081 in the first base plate 100 through one power port. Thus, the circuit of the plurality of switch control lines 108 in the first base plate 100 is simplified.

In another possible implementation, one end of one first switch control line 1081 is electrically connected to one end, proximal to the first switch control line 1081, of one adjacent second switch control line 1082, and the other end of the one first switch control line 1081 is not electrically connected to the one adjacent second switch control line 1082. In this way, the liquid crystal handwriting board 000 simultaneously applies the electrical signal to one second switch control line 1082 and one first switch control line 1081 in the first base plate 100 through one power port. Thus, the circuit of the plurality of switch control lines 108 in the first base plate 100 is simplified.

It should be noted that in some embodiments, the first switch control lines 1081 and the second switch control lines 1082 are not connected as a closed ring as shown in FIG. 11, and a plurality of opening are disposed therein. The plurality of openings are electrically connected to the control assembly in the handwriting apparatus. In this way, the control assembly applies the voltage to the first switch control lines 1081 and the second switch control lines 1082 in the first base plate 100 through the plurality of openings. Thus, the switches electrically connected to the first switch control lines 1081 and the second switch control lines 1082 are ensured to be turned on.

It should also be noted that after the position information of the erasing tool is determined by the liquid crystal handwriting board 000, the voltage applied to the pixel electrodes in the liquid crystal handwriting board 000 is usually greater. In this way, in the process of determining the position information of the erasing tool by the liquid crystal handwriting board 000, although the voltage is applied to the two second switch control lines 1082 and the two first switch control lines 1081, the plurality of driving thin film transistors arranged in an array and connected to the gate lines 107 and the data lines 106 in the liquid crystal handwriting board 000 are not conducted. In this way, the handwriting displayed on the liquid crystal handwriting board 000 is not affected in the process of positioning the multiplexed gate lines and the multiplexed data lines by the liquid crystal handwriting board 000.

For the above two methods for determining the position information of the erasing tool or the handwriting tool on the liquid crystal handwriting board 000, there are various routings of the multiplexed gate lines and the multiplexed data lines in the first base plate 100, and the embodiments of the present disclosure are illustrated by taking the following two optional routings as an example.

Figure 12:
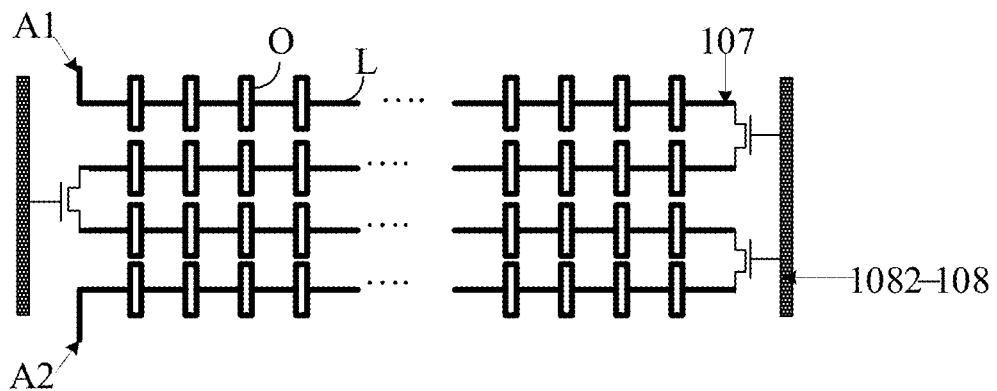
FIG. 12 is a top view of gate lines in a first substrate according to some embodiments of the present disclosure.
Figure 13:
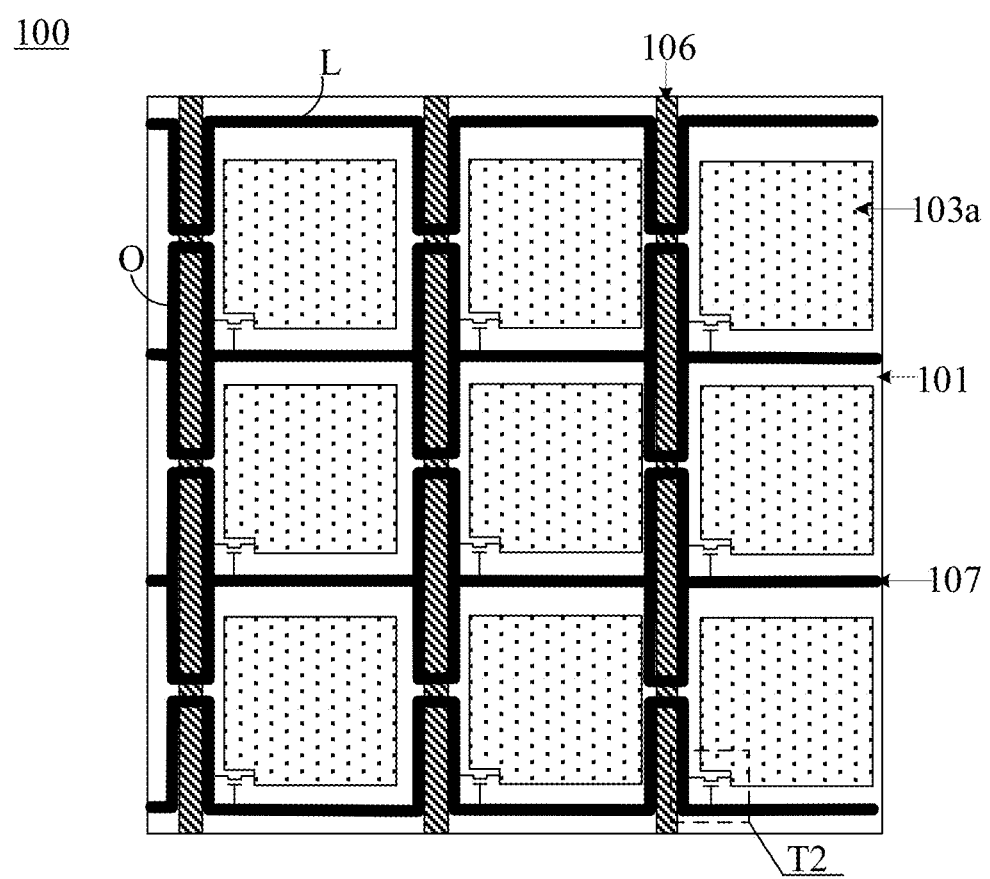
FIG. 13 is a top view of data lines and gate lines in a first substrate according to some embodiments of the present disclosure.

In a first optional routing, referring to FIG. 12 and FIG. 13, FIG. 12 is a top view of the gate lines in the first base plate according to some embodiments of the present disclosure, and FIG. 13 is a top view of the data lines and the gate lines in the first base plate according to some embodiments of the present disclosure. At least one of the multiplexed data line and the multiplexed gate line is provided with a plurality of electromagnetic enhancement parts O and a plurality of connection parts L that are electrically connected. The plurality of electromagnetic enhancement parts O and the plurality of connection parts L are alternately arranged one by one.

In the embodiments of the present disclosure, the electromagnetic enhancement part O is an annular part or a U-shaped part. FIG. 12 is illustrated by taking the case where the electromagnetic enhancement part O is the annular part as an example. It should be noted that FIG. 12 is illustrated by taking the case where the multiplexed gate line is formed by the plurality of annular electromagnetic enhancement parts O and the plurality of connection parts L as an example. In other possible implementations, the multiplexed data line is formed by the plurality of annular electromagnetic enhancement parts O and the plurality of connection parts L, or the multiplexed data line and the multiplexed gate line both are provided with the plurality of annular electromagnetic enhancement parts O and the plurality of connection parts L, which is not limited in the embodiments of the present disclosure.

In the present disclosure, the plurality of multiplexed gate lines 107 in the first electromagnetic touch layer are provided with the plurality of electromagnetic enhancement parts O and the plurality of connection parts L. Therefore, a coil structure formed by the plurality of multiplexed gate lines 107 in the first electromagnetic touch layer generates a stronger electromagnetic field, or this coil structure generates a greater induction current.

Exemplarily, in the case that the liquid crystal handwriting board 000 uses the first method to determine the position information of the erasing tool or the handwriting tool on the liquid crystal handwriting board 000, in the driving stage H1 in the positioning stage P1, the passively driven erasing tool or the passively driven handwriting tool moves on the liquid crystal handwriting board, and the electromagnetic field generated by the coil structure in the first electromagnetic touch layer is stronger as the plurality of multiplexed gate lines in the first electromagnetic touch layer are provided with the plurality of electromagnetic enhancement parts O and the plurality of connection parts L. Therefore, the first coil structure in the erasing tool or the second coil structure in the handwriting tool is capable of generating a greater induction current, such that the new electromagnetic field generated by the coil structure in the erasing tool or the handwriting tool is stronger. In this way, in the induction stage H2 in the positioning stage P1, the plurality of multiplexed data lines in the second electromagnetic touch layer generate a stronger induction signal under the action of the new electromagnetic field. Thus, the position information of the erasing tool or the handwriting tool on the liquid crystal handwriting board 000 is more accurate.

In the present disclosure, in the case that the multiplexed data line is provided with the plurality of electromagnetic enhancement parts O and the plurality of connection parts L, an orthographic projection of a part of the gate line 107 on the first substrate 101 is within the region defined by an orthographic projection of the electromagnetic enhancement parts O of the multiplexed data line on the first substrate 101.

And/or, in the case that the multiplexed gate line is provided with the plurality of electromagnetic enhancement parts O and the plurality of connection parts L, an orthographic projection of a part of the data line 106 on the first substrate 101 is within the region defined by an orthographic projection of the electromagnetic enhancement parts O of the multiplexed gate line on the first substrate 101. FIG. 13 is illustrated by taking the case where the multiplexed gate line is provided with the plurality of electromagnetic enhancement parts O and the plurality of connection parts L, and the multiplexed data lines are arranged as shown in FIG. 8 as an example. It should be noted that in the case that the electromagnetic enhancement part O is a U-shaped part, a length of the U-shaped part in the first direction is greater than half of a distance between two adjacent multiplexed gate lines. In this way, the coil structure formed by the multiplexed gate lines with the U-shaped parts generates a stronger electromagnetic field, or the coil structure generates a greater induction current.

In this case, the overlapping area of the orthogonal projection of the multiplexed data line on the first substrate 101 and the orthogonal projection of the multiplexed gate line on the first substrate 101 is less. In this way, a parasitic capacitance generated by the multiplexed data lines and the multiplexed gate lines in the liquid crystal handwriting board 000 is less. Thus, after the position information of the erasing tool is determined by the liquid crystal handwriting board 000, the voltage applied by the control assembly 010 to the pixel electrodes in the to-be-erased region through the plurality of multiplexed data lines and the plurality of multiplexed gate lines is not easily influenced by the parasitic capacitance as the parasitic capacitance generated by the multiplexed data lines and the multiplexed gate lines in the liquid crystal handwriting board 000 is less, such that the liquid crystal handwriting board 000 shows a greater local erasing effect.

Figure 14:
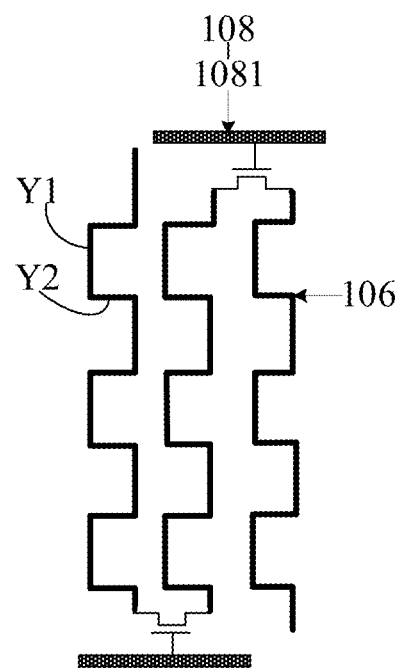
FIG. 14 is a top view of data lines in a first substrate according to some embodiments of the present disclosure.
Figure 15:
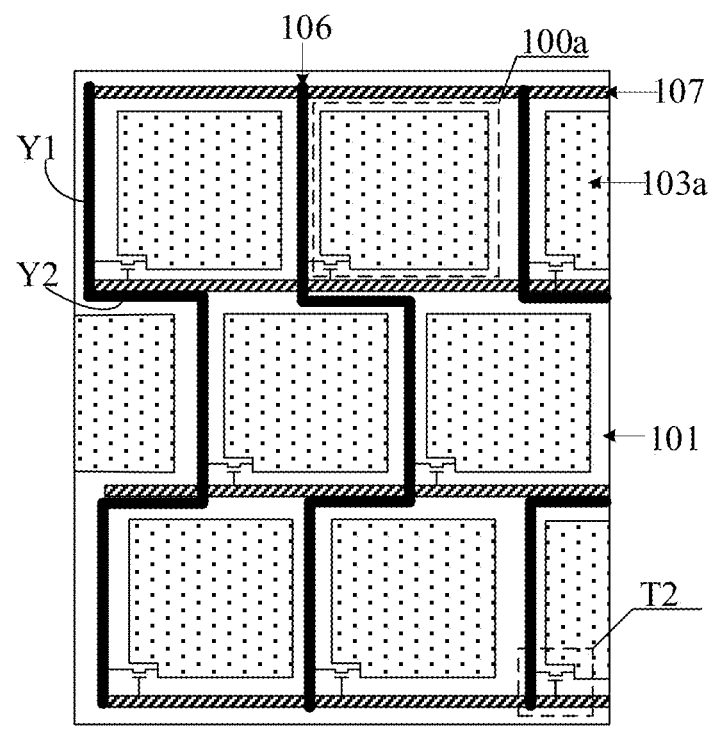
FIG. 15 is a top view of data lines and gate lines in another first substrate according to some embodiments of the present disclosure.

In a second optional routing, referring to FIG. 14 and FIG. 15, FIG. 14 is a top view of the data lines in the first substrate according to some embodiments of the present disclosure, and FIG. 15 is a top view of the data lines and the gate lines in another first substrate according to some embodiments of the present disclosure. The first base plate 100 is provided with a plurality of sub-pixel regions 100*a* arranged in an array. Exemplarily, any two adjacent gate lines 107 and any two adjacent data lines 106 define one sub-pixel region.

At least one of the multiplexed data line 106 and the multiplexed gate line 107 is provided with a plurality of first extension parts Y1 and a plurality of second extension parts Y2 that are electrically connected. The plurality of first extension parts Y1 and the plurality of second extension parts Y2 are alternately arranged one by one and end to end, and an extension direction of the first extension parts Y1 is intersected with an extension direction of the second extension parts Y2. The extension direction of the first extension parts Y1 is perpendicular to the extension direction of the gate lines 107, and the extension direction of the second extension parts Y2 is parallel to the extension direction of the gate lines 107.

In the same signal line (the multiplexed data line 106 or multiplexed gate line 107), any two adjacent first extension parts Y1 and the second extension part Y2 between the two adjacent first extension parts Y1 form a bending structure. A region defined by the bending structure semi-surrounds at least part of the region of one sub-pixel region 100*a*. The bending structure defines a semi-enclosed region along three side edges, connected end to end, of the sub-pixel region 100*a*. FIG. 15 is illustrated by taking the case where the multiplexed data line is provided with the plurality of first extension parts Y1 and the plurality of second extension parts Y2, and the multiplexed gate lines are arranged as shown in FIG. 8 as an example. In other possible implementations, the multiplexed gate line is provided with the plurality of first extension parts Y1 and the plurality of second extension parts Y2, or the multiplexed data line and the multiplexed gate line are both provided with the plurality of first extension parts Y1 and the plurality of second extension parts Y2, which is not limited in the embodiments of the present disclosure.

In the embodiments of the present disclosure, as shown in FIG. 15, as the plurality of multiplexed data lines in the second electromagnetic touch layer have the bending structures, the coil structure formed by the plurality of multiplexed data lines in the second electromagnetic touch layer generates a stronger electromagnetic field, or the coil structure generates a greater induction current.

Exemplarily, in the case that the liquid crystal handwriting board 000 uses the first method to determine the position information of the erasing tool or the handwriting tool on the liquid crystal handwriting board 000, in the driving stage H1 in the positioning stage P1, the passively driven erasing tool or the passively driven handwriting tool moves on the liquid crystal handwriting board, and the induction current is generated by the first coil structure in the erasing tool or the second coil structure in the handwriting tool due to the electromagnetic field generated by the coil structure in the first electromagnetic touch layer, such that the coil structure in the erasing tool or the handwriting tool generates a new electromagnetic field. In this way, in the induction stage H2 in the positioning stage P1, as the plurality of multiplexed data lines in the second electromagnetic touch layer are provided with the plurality of bending structures, the coil structure in the second electromagnetic touch layer generates a stronger induction signal under the action of the new electromagnetic field. Thus, the position information of the erasing tool or the handwriting tool on the liquid crystal handwriting board 000 is more accurate.

Figure 16:
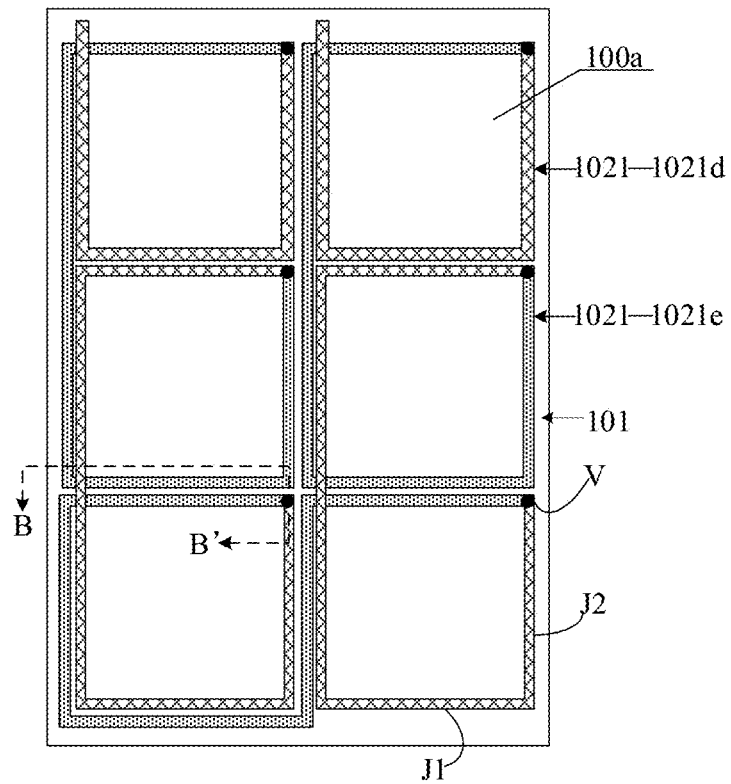
FIG. 16 is a top view of still a further first substrate according to some embodiments of the present disclosure.
Figure 17:
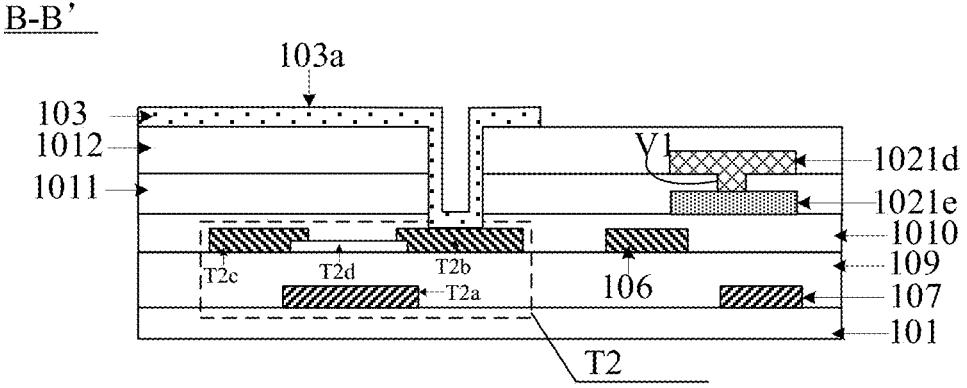
FIG. 17 is a schematic structural diagram of film layers at B-B' shown in FIG. 15.

In a second optional implementation, referring to FIG. 16 and FIG. 17, FIG. 16 is a top view of still a further first substrate according to some embodiments of the present disclosure, and FIG. 17 is a schematic structural diagram of film layers at B-B' shown in FIG. 16. The plurality of electromagnetic signal lines 1021 in the electromagnetic touch layer 102 are organized into two groups, the two groups of electromagnetic signal lines 1021 are disposed in different layers, and two ends of one electromagnetic signal line 1021 in one group of electromagnetic signal lines 1021*d* are respectively electrically connected to two electromagnetic signal lines 1021 in the other group of electromagnetic signal lines 1021*e*. The two ends of one electromagnetic signal line 1021 in one group of electromagnetic signal lines 1021*d* are respectively electrically connected to the two electromagnetic signal lines 1021 in the other group of electromagnetic signal lines 1021*e* through via holes V. In this way, the two groups of electromagnetic signal lines 1021 in the electromagnetic touch layer 102 are connected in series to form the coil structure.

Exemplarily, the first base plate 100 includes a plurality of sub-pixel regions 100*a* arranged in an array. The electromagnetic signal lines 1021 all include a plurality of signal line segments connected in series in sequence, a part of the plurality of signal line segments J1 in the plurality of signal line segments are parallel to the row arrangement of the plurality of sub-pixel regions 100*a*, and the other part of signal line segments J2 in the plurality of signal line segments are parallel to the column arrangement of the plurality of sub-pixel regions 100*a*. One sub-pixel region 100*a* is the smallest erasing region.

In the embodiments of the present disclosure, there are various arrangements of electromagnetic signal lines, and the embodiments of the present disclosure are illustrated by taking the following two optional arrangements as an example.

In a first optional arrangement, in the case that one end of one electromagnetic signal line 1021 in one group of electromagnetic signal lines 1021*d* is electrically connected to one end of one electromagnetic signal line 1021 in the other group of electromagnetic signal lines 1021*e*, the two electromagnetic signal lines 1021 define at least one sub-pixel region 100*a*. The smaller the region defined by the two electromagnetic signal lines 1021, the greater the positioning accuracy of the liquid crystal handwriting board 000 by the electromagnetic touch layer. In the present disclosure, FIG. 16 shows the case where the two electromagnetic signal lines 1021 define one sub-pixel region 100*a*.

In a second optional arrangement, one electromagnetic signal line 1021 in one group of electromagnetic signal lines (1021*d*, 1021*e*) in two groups of electromagnetic signal lines 1021 semi-surrounds at least one sub-pixel region 100*a*. One electromagnetic signal line 102 is provided with at least one bending structure, and the region defined by the bending structure semi-surrounds at least one sub-pixel region 100*a*. The bending structure defines a semi-enclosed region along three side edges, connected end to end, of the sub-pixel region 100*a*.

In the present disclosure, the induction method for determining the position information of the erasing tool or the handwriting tool on the liquid crystal handwriting board 000 refers to the above second method, which is not repeated in detail in the embodiments of the present disclosure. It should be noted that in the case that two groups of electromagnetic signal lines 1021 in the electromagnetic touch layer 102 are connected in series, the coil structure formed in the liquid crystal handwriting board 000 is a three-dimensional coil. In this way, in the case that the erasing tool moves on the liquid crystal handwriting board, the induction current generated in the three-dimensional coil structure is greater due to the electromagnetic field generated in the first coil structure of the erasing tool, such that the induction signal output from the electromagnetic touch layer 102 is stronger. Thus, the position information of the erasing tool on the liquid crystal handwriting board 000 subsequently determined by the control assembly 010 is more accurate, and the local erasing effect of the liquid crystal handwriting board 000 is greater. Accordingly, in the case that the liquid crystal handwriting board 000 is in the writing mode, the position information of the handwriting tool on the liquid crystal handwriting board 000 is determined more accurately, such that the effect of the handwriting saved by the liquid crystal handwriting board 000 is also greater.

In the embodiments of the present disclosure, as shown in FIG. 17, the first base plate 100 further includes: a plurality of data lines 106 and a plurality of gate lines 107. The electromagnetic signal lines 1021 are disposed in different layers from the data lines 106 and the gate lines 107. That is, the electromagnetic signal lines 1021 are not multiplexed with the gate lines 107 or the data lines 106 in the first base plate 100.

In the present disclosure, the position of the electromagnetic touch layer 102 in the first base plate 100 has various structures, and the embodiments of the present disclosure are illustrated by taking the following two structures as an example.

In a first structure, as shown in FIG. 17, the electromagnetic touch layer 102 is disposed on a side of the first substrate 101 proximal to the second substrate 201. The first base plate 100 further includes: a first passivation layer 1010 between the data lines 106 and one group of electromagnetic signal lines 1021e, a second passivation layer 1011 between one group of electromagnetic signal lines 1021e and one group of electromagnetic signal lines 1021d, and a third passivation layer 1012 between one group of electromagnetic signal lines 1021d and the pixel electrode layer 103. The second passivation layer 1011 is provided with via holes V1 for connecting the electromagnetic signal lines in the two groups of electromagnetic signal lines. The pixel electrode layer 103 is disposed on a side of the group of electromagnetic signal lines 1021d facing away from the first substrate 101. In this way, the pixel electrode layer 103 is closer to the common electrode layer 202 in the second base plate 200 in the liquid crystal handwriting board 000, such that the liquid crystal molecules between the pixel electrode layer 103 and the common electrode layer 202 are more easily deflected under the action of an electric field force.

Figure 18:
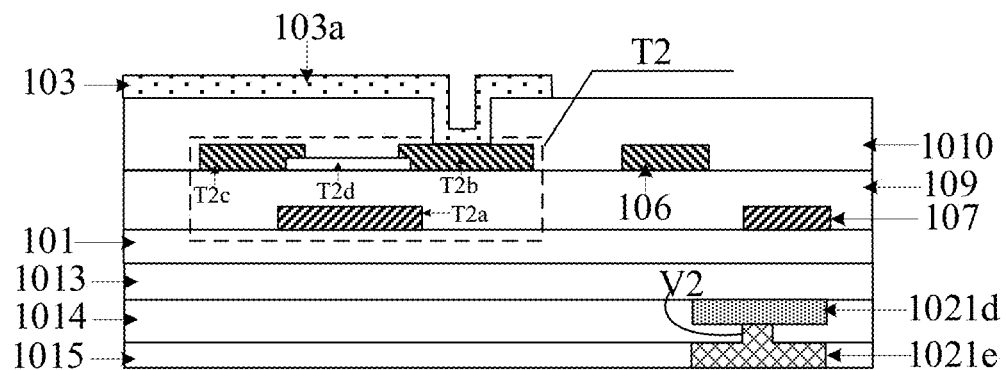
FIG. 18 is another schematic structural diagram of film layers at B-B' shown in FIG. 16.

In a second structure, referring to FIG. 18, FIG. 18 is another schematic structural diagram of film layers at B-B' shown in FIG. 16. The electromagnetic touch layer 102 is disposed on a side of the first substrate 101 facing away from the second substrate 201. The first base plate 100 further includes: a fourth passivation layer 1013 between the first substrate 101 and one group of electromagnetic signal lines 1021d, a fifth passivation layer 1014 between one group of electromagnetic signal lines 1021e and one group of electromagnetic signal lines 1021d, and a sixth passivation layer 1015 disposed on a side of the fifth passivation layer 1014 facing away from the first substrate 101. The fifth passivation layer 1014 is provided with via holes V2 for connecting the electromagnetic signal lines in the two groups of electromagnetic signal lines.

For the above two optional implementations, as shown in FIG. 13, FIG. 15, FIG. 17, and FIG. 18, the first base plate 100 in the liquid crystal handwriting board 000 further includes: a plurality of drive transistors T2. The pixel electrode layer 103 is provided with a plurality of pixel electrodes 103a electrically connected to the plurality of drive transistors T2 in one-to-one correspondence. The drive transistor T2 includes: a gate electrode T2a, a first electrode T2b, a second electrode T2c, and an active layer T2d. The first electrode T2b and the second electrode T2c are attached with the active layer T2d, and the active layer T2d is insulated from the gate electrode T2a. For example, the active layer T2d is insulated from the gate electrode T2a by a gate electrode insulating layer 109. Exemplarily, the thin film transistor shown in FIG. 13 and FIG. 15 is the drive transistor T2.

The embodiments of the present disclosure are illustrated by taking the case where the gate electrode T2a in the drive transistor T2 is closer to a side of the substrate 1012 than the active layer T2d as an example, that is, the drive transistor T2 is a bottom gate type transistor. In other possible implementations, the drive transistor T2 is also a top gate type transistor, which is not limited in the embodiments of the present disclosure. It should also be noted that the first electrode T2b in the drive transistor T2 is one of the source electrode and the drain electrode, and the second electrode T2c is the other of the source electrode and the drain electrode. Exemplarily, the first electrode T2b in the drive transistor T2 is electrically connected to the pixel electrode 103a through a via hole.

It should be noted that the gate line 107 in the first base plate 100 is disposed in the same layer and made of the same material as the gate electrode T2a in the drive transistor T2. That is, the gate line 107 and the gate electrode T2a in the drive transistor T2 are acquired through a one patterning process. The data line 106 is disposed in the same layer and made of the same material as the first electrode T2b and the second electrode T2c in the drive transistor T2. That is, the data line 106 and the first electrode T2b and the second electrode T2c in the drive transistor T2 are acquired through a one patterning process.

It should also be noted that the plurality of drive transistors T2 and the plurality of thin film transistors T1 in the liquid crystal handwriting board 000 are disposed in the same layer. Exemplarily, the gate electrode T2a in the drive transistor T2 and the gate electrode in the thin film transistor T1 are acquired by the one patterning process, the active layer T2d in the drive transistor T2 and the active layer in the thin film transistor T1 are acquired by the one patterning process, and the first electrode T2b and the second electrode T2c in the drive transistor T2 and the first electrode and the second electrode in the thin film transistor T1 are acquired by the one patterning process. The one patterning process herein and the one patterning process in the above embodiments all include: photoresist coating, exposing, developing, etching, and photoresist removing.

In summary, the liquid crystal handwriting board according to the embodiments of the present disclosure includes: the first base plate and the second base plate that are oppositely disposed, and the liquid crystal layer disposed between the first base plate and the second base plate. The electromagnetic touch layer in the liquid crystal handwriting board is provided with the electromagnetic signal lines connected in series, and the electromagnetic signal lines connected in series form a coil structure. Therefore, such coil structure is cooperated with the first coil structure in the erasing tool or the second coil structure in the handwriting tool, such that the control assembly in the handwriting apparatus determines the position information of the erasing tool or the handwriting tool on the liquid crystal handwriting board after the liquid crystal handwriting board is integrated in the handwriting apparatus. In this way, the handwriting apparatus can realize the function of locally erasing or saving the handwriting. Thus, according to the present disclosure, the infrared positioning apparatus is not required to be disposed in the liquid crystal handwriting board, and only the electromagnetic touch layer integrated in the first base plate is required to realize the function of locally erasing or saving the handwriting, such that the overall thickness of the liquid crystal handwriting board and a width of a frame of the liquid crystal handwriting board are effectively reduced, and the screen-to-body ratio of the liquid crystal handwriting board is relatively great.

The embodiments of the present disclosure also provide a handwriting apparatus, as shown in FIG. 5, the handwriting apparatus includes: a liquid crystal handwriting board 000 and a control assembly 010 electrically connected to the liquid crystal handwriting board 000. The liquid crystal handwriting board 000 is the liquid crystal handwriting board in the above embodiments. The control assembly 010 is configured to: in the case that the liquid crystal handwriting board 000 is in an erasing mode, acquire a first induction signal output by an electromagnetic touch layer, and determine the position information of a to-be-erased region based on the first induction signal and a corresponding relationship between a touch position recorded by the control assembly and the induction signal; in the case that the liquid crystal handwriting board 000 is in a writing mode, acquire a second induction signal output by the electromagnetic touch layer, and determine the position information of handwriting based on the second induction signal and the corresponding relationship.

References may be made to the corresponding contents in the above embodiments for the specific structure and operation principle of the handwriting apparatus, which are not repeated in detail in the embodiments of the present disclosure.

The embodiments of the present disclosure also provide a method for controlling a handwriting apparatus. The handwriting apparatus is the handwriting apparatus according to the above embodiments. The method for controlling the handwriting apparatus includes: in the case that the liquid crystal handwriting board is in an erasing mode, determining position information of a to-be-erased region by an electromagnetic touch layer, and applying a pixel voltage to pixel electrodes in the to-be-erased region, such that a voltage difference is formed between the pixel electrodes in the to-be-erased region and a common electrode layer; and in the case that the liquid crystal handwriting board is in a writing mode, determining the position information of handwriting by the electromagnetic touch layer, and generating image information corresponding to the handwriting.

References may be made to the corresponding contents in the above embodiments for the specific principle of the method for controlling the handwriting apparatus, which are not repeated in detail in the embodiments of the present disclosure.

Figure 19:
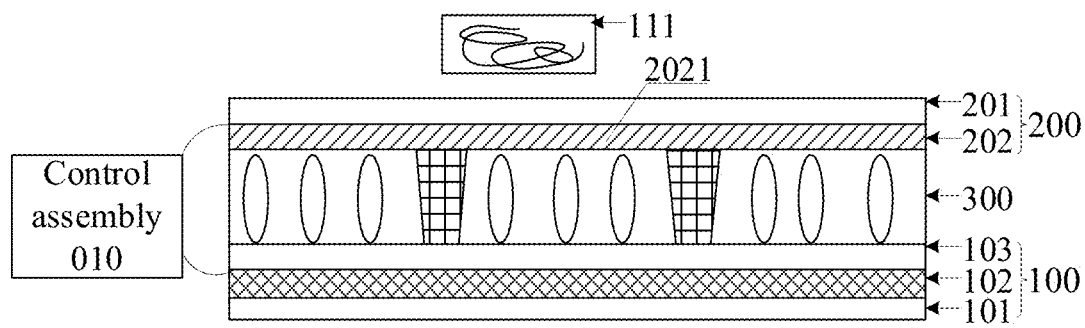
FIG. 19 is a schematic structural diagram of a handwriting system according to some embodiments of the present disclosure.

The embodiments of the present disclosure also provide a handwriting system, referring to FIG. 19, FIG. 19 is a schematic structural diagram of the handwriting system according to some embodiments of the present disclosure. The handwriting system includes: an erasing tool 111 and a handwriting apparatus 001. The erasing tool 111 is provided with a first coil structure. The liquid crystal handwriting board 000 is the liquid crystal handwriting board in the above embodiments. For example, the liquid crystal handwriting board 000 is the liquid crystal handwriting board shown in FIG. 3, FIG. 8, FIG. 11, FIG. 13, FIG. 15, or FIG. 16. The erasing tool 111 is the above actively driven erasing tool or the above passively driven erasing tool.

In the embodiments of the present disclosure, in the case that the erasing tool is the actively driven erasing tool, the liquid crystal handwriting board 000 is the liquid crystal handwriting board shown in FIG. 11. References may be made to the corresponding contents in the above embodiments for the specific erasing principle and process, which are not repeated in detail in the present disclosure. In the case that the erasing tool is the passively driven erasing tool, the liquid crystal handwriting board 000 is the liquid crystal handwriting board shown in FIG. 8. References may be made to the corresponding contents in the above embodiments for the specific erasing principle and process, which are not repeated in detail in the present disclosure.

Figure 20:
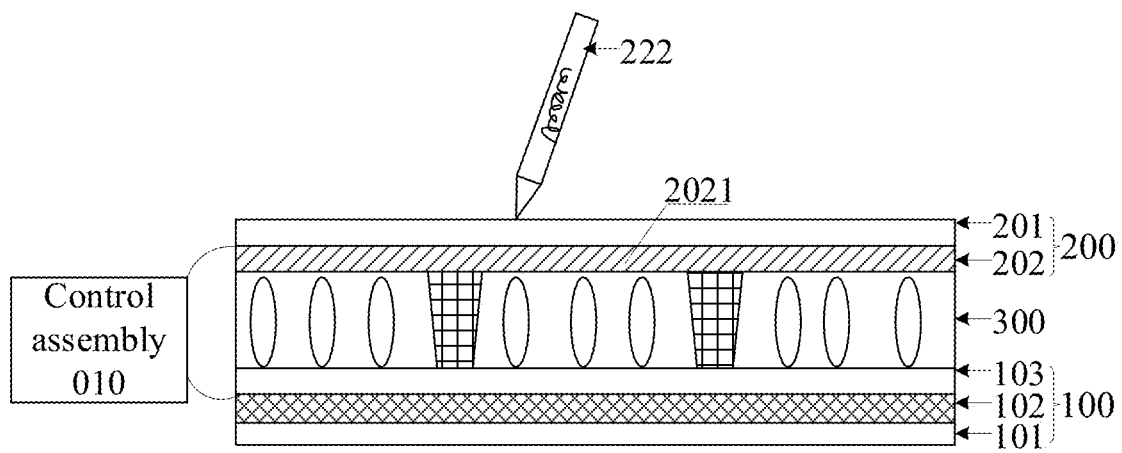
FIG. 20 is a schematic structural diagram of another handwriting system according to some embodiments of the present disclosure.

In the present disclosure, referring to FIG. 20, FIG. 20 is a schematic structural diagram of another handwriting system according to some embodiments of the present disclosure. The handwriting system 111 further includes: a handwriting tool 222 including a second coil structure. The liquid crystal handwriting board 000 is the liquid crystal handwriting board in the above embodiments. For example, the liquid crystal handwriting board 000 is the liquid crystal handwriting board shown in FIG. 3, FIG. 8, FIG. 11, FIG. 13, FIG. 15, or FIG. 16. The handwriting tool 222 is the above actively driven handwriting tool or the above passively driven handwriting tool.

In the embodiments of the present disclosure, in the case that the handwriting tool is the actively driven handwriting tool, the liquid crystal handwriting board 000 is the liquid crystal handwriting board shown in FIG. 11. References may be made to the corresponding contents in the above embodiments for the specific handwriting saving principle and process, which are not repeated in detail in the present disclosure. In the case that the handwriting tool is the passively driven handwriting tool, the liquid crystal handwriting board 000 is the liquid crystal handwriting board shown in FIG. 8. References may be made to the corresponding contents in the above embodiments for the specific handwriting saving principle and process, which are not repeated in detail in the present disclosure.

It should be noted that in the accompanying drawings, the sizes of the layers and regions may be scaled up for clarity of the illustration. It can be understood that when an element or layer is described as being "above" another element or layer, the described element or layer may be directly on the other element or layer, or an intermediate layer may exist. In addition, it can be understood that when an element or layer is described as being "below" another element or layer, the described element or layer may be directly below the other element or layer, or more than one intermediate layer or element may exist. In addition, it can also be understood that when a layer or element is described as being arranged "between" two layers or elements, the described layer or element may be the only layer between the two layers or elements, or more than one intermediate layer or element may exist. In the whole description, like reference numerals denote like elements.

In the present disclosure, the terms "first" and "second" are configured for descriptive purposes only and are not to be construed as indicating or implying relative importance. The term "a plurality of" refers to two or more, unless specifically defined otherwise.

Described above are merely exemplary embodiments of the present disclosure, and are not intended to limit the present disclosure. Any modifications, equivalent substitutions, improvements, and the like within the spirit and principles of the disclosure are included in the scope of protection of the present disclosure.

What is claimed is:

1. A liquid crystal handwriting board, comprising: a first base plate and a second base plate that are oppositely disposed, and a liquid crystal layer disposed between the first base plate and the second base plate, wherein
    the liquid crystal layer comprises bistable liquid crystal molecules;
    the first base plate comprises: a first substrate, and an electromagnetic touch layer and a pixel electrode layer that are disposed on a side of the first substrate, wherein the electromagnetic touch layer is provided with a plurality of electromagnetic signal lines, the plurality of electromagnetic signal lines being sequentially connected in series one by one and a number of the plurality of electromagnetic signal lines being more than two; and
    the second base plate comprises: a second substrate, and a common electrode layer that is disposed on a side of the second substrate.

2. The liquid crystal handwriting board according to claim 1, wherein the first base plate further comprises: a plurality of first connection structures and a plurality of second connection structures, wherein the plurality of first connection structures are all distributed on one side of the plurality of electromagnetic signal lines, and the plurality of second connection structures are all distributed on another side of the plurality of electromagnetic signal lines; wherein one end of a first electromagnetic signal line is electrically connected to one end of a second electromagnetic signal line by one first connection structure, and another end of the first electromagnetic signal line is electrically connected to one end of a third electromagnetic signal line by one second connection structure, wherein the first electromagnetic signal line is one of the plurality of electromagnetic signal lines, the second electromagnetic signal line is an electromagnetic signal line in the plurality of electromagnetic signal lines disposed on a side of the first electromagnetic signal line, and the third electromagnetic signal line is an electromagnetic signal line in the plurality of electromagnetic signal lines disposed on a side, distal from the second electromagnetic signal line, of the first electromagnetic signal line; and the plurality of first connection structures and the plurality of second connection structures are all switches.

3. The liquid crystal handwriting board according to claim 2, wherein the first base plate further comprises: a plurality of data lines and a plurality of gate lines, wherein the plurality of electromagnetic signal lines in the electromagnetic touch layer are at least one of the plurality of data lines and the plurality of gate lines.

4. The liquid crystal handwriting board according to claim 3, wherein each of the switches comprises a first electrode, a second electrode, and a control electrode, wherein the control electrode is configured to conduct the first electrode and the second electrode upon receiving a conduction signal, and the first electrode and the second electrode are respectively electrically connected to end parts of two of the plurality of electromagnetic signal lines;

the first base plate further comprises: at least two switch control lines, wherein in the at least two switch control lines, one switch control line is electrically connected to the control electrodes of at least part of the plurality of first connection structures, and another switch control line is electrically connected to the control electrodes of at least part of the plurality of second connection structures;

wherein in the case that both the first connection structure and the second connection structure are turned on under control of the at least two switch control lines, the electromagnetic signal lines electrically connected to the first connection structure and the second connection structure are sequentially connected in series.

5. The liquid crystal handwriting board according to claim 4, wherein the at least two switch control lines comprise N groups of switch control lines, N being an integer greater than 1; wherein one group of switch control lines comprises: one switch control line for being electrically connected to the control electrodes of at least part of the plurality of first connection structures, and one switch control line for being electrically connected to the control electrodes of at least part of the plurality of second connection structures; and the control electrodes of the adjacent first connection structures are respectively electrically connected to different groups of switch control lines; and the control electrodes of the adjacent second connection structures are respectively electrically connected to different groups of switch control lines.

6. The liquid crystal handwriting board according to claim 5, comprising: N adjacently disposed first connection structures, and N adjacently disposed second connection structures;

wherein the N adjacently disposed first connection structures are respectively electrically connected to different groups of the N groups of switch control lines, and the N adjacently disposed second connection structures are respectively electrically connected to different groups of the N groups of switch control lines.

7. The liquid crystal handwriting board according to claim 4, wherein the at least two switch control lines comprise two switch control lines disposed at the same layer;

wherein in the two switch control lines, one switch control line is electrically connected to the control electrodes of all the plurality of first connection structures, and another switch control line is electrically connected to the control electrodes of all the plurality of second connection structures.

8. The liquid crystal handwriting board according to claim 4, wherein the electromagnetic touch layer is disposed on a side, facing the second base plate, of the first substrate, the first base plate includes two electromagnetic touch layers, the electromagnetic signal lines in one electromagnetic touch layer are the data lines, and the electromagnetic signal lines in another electromagnetic touch layer are the gate lines; the data lines extend along a first direction, the gate lines extend along a second direction, the first direction being different from the second direction;

the at least two switch control lines comprise: two first switch control lines and two second switch control lines, wherein an extension direction of the first switch control lines is the second direction, and an extension direction of the second switch control lines is the first direction;

the data lines in the plurality of data lines serving as the electromagnetic signal lines are multiplexed data lines; the gate lines in the plurality of gate lines serving as the electromagnetic signal lines are multiplexed gate lines;

wherein the plurality of data lines are arranged between the two first switch control lines, and the first switch control lines are electrically connected to the control electrodes of the switches for connecting two adjacent multiplexed data lines; and the plurality of gate lines are arranged between the two second switch control lines, and the second switch control lines are electrically connected to the control electrodes of the switches for connecting two adjacent multiplexed gate lines.

9. The liquid crystal handwriting board according to claim 8, wherein at least one of the multiplexed data line and the multiplexed gate line is provided with a plurality of electromagnetic enhancement parts and a plurality of connection parts which are electrically connected, wherein the plurality of electromagnetic enhancement parts and the plurality of connection parts are alternately arranged one by one.

10. The liquid crystal handwriting board according to claim 9, wherein in the case that the multiplexed data line is provided with the plurality of electromagnetic enhancement parts and the plurality of connection parts, an orthographic projection of a part of the gate line on the first substrate is within a region defined by an orthographic projection of the electromagnetic enhancement parts of the multiplexed data line on the first substrate; and/or in the case that the multiplexed gate line is provided with the plurality of electromagnetic enhancement parts and the plurality of connection parts, an orthographic projection of a part of the data line on the first substrate is within a region defined by an orthographic projection of the electromagnetic enhancement parts of the multiplexed gate line on the first substrate.

11. The liquid crystal handwriting board according to claim 8, wherein the first base plate is provided with a plurality of sub-pixel regions arranged in an array; and at least one of the multiplexed data line and the multiplexed gate line is provided with a plurality of first extension parts and a plurality of second extension parts that are electrically connected, wherein the first extension parts and the second extension parts are alternately arranged one by one and end to end, an extension direction of the first extension parts is intersected with an extension direction of the second extension parts, and any two adjacent first extension parts and the second extension part between the any two adjacent first extension parts form a bending structure, wherein a region defined by the bending structure semi-surrounds at least part of one sub-pixel region.

12. The liquid crystal handwriting board according to claim 8, wherein the two electromagnetic touch layers are respectively a first electromagnetic touch layer and a second electromagnetic touch layer, wherein the first electromagnetic touch layer and the second electromagnetic touch layer both are provided with two signal ports; wherein the two signal ports in the first electromagnetic touch layer are insulated from the two signal ports in the second electromagnetic touch layer, the two signal ports in the first electromagnetic touch layer are both signal input ports, and the two signal ports in the second electromagnetic touch layer are both signal output ports; or the two signal ports in the first electromagnetic touch layer are respectively electrically connected to the two signal ports in the second electromagnetic touch layer, and the two signal ports in the first electromagnetic touch layer and the two signal ports in the second electromagnetic touch layer are all signal output ports.

13. The liquid crystal handwriting board according to claim 8, wherein the data lines in at least partial region of the liquid crystal handwriting board all serve as the multiplexed data lines, and/or the gate lines in at least partial region of the liquid crystal handwriting board all serve as the multiplexed gate lines.

14. The liquid crystal handwriting board according to claim 1, wherein the plurality of electromagnetic signal lines are organized into two groups, wherein the two groups of electromagnetic signal lines are disposed in different layers, and two ends of one electromagnetic signal line in one group of electromagnetic signal lines are respectively electrically connected to two electromagnetic signal lines in another group of electromagnetic signal lines;

the first base plate is provided with a plurality of sub-pixel regions arranged in an array;

the electromagnetic signal lines all comprise a plurality of signal line segments connected in series in sequence, a part of the plurality of signal line segments are parallel to a row arrangement of the plurality of sub-pixel regions, and another part of the plurality of signal line segments are parallel to a column arrangement of the plurality of sub-pixel regions;

wherein in the case that one end of one electromagnetic signal line in one group of electromagnetic signal lines is electrically connected to one end of one electromagnetic signal line in another group of electromagnetic signal lines, the two electromagnetic signal lines are capable of defining at least one sub-pixel region.

15. The liquid crystal handwriting board according to claim 14, wherein one electromagnetic signal line in one group of electromagnetic signal lines semi-surrounds at least one sub-pixel region.

16. The liquid crystal handwriting board according to claim 15, wherein the first base plate further comprises: a plurality of data lines and a plurality of gate lines, wherein the electromagnetic signal lines are disposed in different layers from the plurality of data lines and in different layers from the plurality of gate lines;

the electromagnetic touch layer is disposed on a side of the first substrate proximal to the second substrate, an insulating layer is disposed on a side of the electromagnetic signal line facing away from the first substrate, and the pixel electrode layer is disposed on a side of the insulating layer facing away from the first substrate; or the electromagnetic touch layer is disposed on a side of the first substrate facing away from the second substrate.

17. A handwriting apparatus, comprising: a liquid crystal handwriting board, and a control assembly electrically connected to the liquid crystal handwriting board; wherein the liquid crystal handwriting board comprises: a first base plate and a second base plate that are oppositely disposed, and a liquid crystal layer disposed between the first base plate and the second base plate, wherein the liquid crystal layer comprises bistable liquid crystal molecules;

the first base plate comprises: a first substrate, and an electromagnetic touch layer and a pixel electrode layer that are disposed on a side of the first substrate, wherein the electromagnetic touch layer is provided with a plurality of electromagnetic signal lines, the plurality of electromagnetic signal lines being sequentially connected in series one by one and a number of the plurality of electromagnetic signal lines being more than two; and the second base plate comprises: a second substrate, and a common electrode layer that is disposed on a side of the second substrate; and the control assembly is configured to: in the case that the liquid crystal handwriting board is in an erasing mode, determine position information of a to-be-erased region by the electromagnetic touch layer, and apply a pixel voltage to pixel electrodes in the to-be-erased region, such that a voltage difference is formed between the pixel electrodes in the to-be-erased region and the common electrode layer.

18. The handwriting apparatus according to claim 17, wherein the control assembly is configured to: in the case that the liquid crystal handwriting board is in the erasing mode, acquire a first induction signal output by the electromagnetic touch layer, and determine the position information of the to-be-erased region based on the first induction signal and a corresponding relationship between a touch position recorded by the control assembly and an induction signal;

the control assembly is configured to: in the case that the liquid crystal handwriting board is in a writing mode, determine position information of handwriting by the electromagnetic touch layer, and generate image information corresponding to the handwriting; and the control assembly is further configured to: in the case that the liquid crystal handwriting board is in the writing mode, acquire a second induction signal output by the electromagnetic touch layer, and determine the position information of the handwriting based on the second induction signal and the corresponding relationship.

19. A handwriting system, comprising: an erasing tool and a handwriting apparatus, wherein the erasing tool has a first coil structure; and the handwriting apparatus comprises: a liquid crystal handwriting board, and a control assembly electrically connected to the liquid crystal handwriting board; wherein the liquid crystal handwriting board comprises: a first base plate and a second base plate that are oppositely disposed, and a liquid crystal layer disposed between the first base plate and the second base plate, wherein the liquid crystal layer comprises bistable liquid crystal molecules;

the first base plate comprises: a first substrate, and an electromagnetic touch layer and a pixel electrode layer that are disposed on a side of the first substrate, wherein the electromagnetic touch layer is provided with a plurality of electromagnetic signal lines, the plurality of electromagnetic signal lines being sequentially connected in series one by one and a number of the plurality of electromagnetic signal lines being more than two; and the second base plate comprises: a second substrate, and a common electrode layer that is disposed on a side of the second substrate; and the control assembly is configured to: in the case that the liquid crystal handwriting board is in an erasing mode, determine position information of a to-be-erased region by the electromagnetic touch layer, and apply a pixel voltage to pixel electrodes in the to-be-erased region, such that a voltage difference is formed between the pixel electrodes in the to-be-erased region and the common electrode layer.

* * * * *